(12) United States Patent
Watanabe et al.

(10) Patent No.: US 7,373,186 B2
(45) Date of Patent: May 13, 2008

(54) FOLDING-TYPE PORTABLE INFORMATION DEVICE PROVIDED WITH IMAGE CAPTURING FUNCTION

(75) Inventors: Takaaki Watanabe, Yokohama (JP);
Seiji Horii, Yokohama (JP); Shigeru Matsumura, Yokohama (JP)

(73) Assignee: Kyocera Corporation, Fushimi-ku, Kyoto-shi, Kyoto (KP)

( * ) Notice: Subject to any disclaimer, the term of this patent is extended or adjusted under 35 U.S.C. 154(b) by 746 days.

(21) Appl. No.: 10/608,595

(22) Filed: Jun. 26, 2003

(65) Prior Publication Data

US 2004/0090552 A1    May 13, 2004

(30) Foreign Application Priority Data

Jun. 26, 2002  (JP) .............. 2002-185598
Jun. 28, 2002  (JP) .............. 2002-190478
Jun. 28, 2002  (JP) .............. 2002-190479

(51) Int. Cl.
    *H04M 1/00*       (2006.01)
(52) U.S. Cl. ............... 455/575.3; 455/566.1; 455/575.1; 379/433.13; 361/683
(58) Field of Classification Search ........... 455/575.3, 455/566.1, 575.1; 348/14.01; 379/433, 379/433.13; 361/683
    See application file for complete search history.

(56) References Cited

U.S. PATENT DOCUMENTS

| | | | |
|---|---|---|---|
| 6,275,714 B1 * | 8/2001 | Kintz et al. .............. 455/566 |
| 6,373,006 B1 * | 4/2002 | Toki ............ 200/61.7 |
| 6,879,337 B2 | 4/2005 | Tatehana et al. |
| 2001/0030850 A1 * | 10/2001 | Ditzik .......... 361/683 |
| 2001/0036845 A1 * | 11/2001 | Park ............ 455/566 |
| 2002/0058531 A1 * | 5/2002 | Terasaki et al. ........... 455/556 |

FOREIGN PATENT DOCUMENTS

| | | |
|---|---|---|
| JP | 2002-94629 | 3/2002 |
| JP | 2002-125008 | 4/2002 |
| JP | 2001-164923 | 12/2002 |
| JP | 2001-181915 | 12/2002 |
| KR | 1020010068807 A | 1/2000 |

OTHER PUBLICATIONS

Japanese office action of JP2002-185598 and an English translation Jan. 2004.
KEITA (Portable Telephone) Best, Japan, Scott Bank Publishing Corporation, Apr. 15, 2002, vol. 7, pp. 28-33 and Partial English translation.
URL. http: K-tai. impress. co. jp lcda/article/showcase-top/3687. html and partial English translation Oct. 2006.
Japanese office action of JP2002-190479 and English translation Oct. 2006.
Japanese office action of JP2002-190478 and its English translation May 2004.

* cited by examiner

*Primary Examiner*—Danh Le
(74) *Attorney, Agent, or Firm*—Schulte Roth & Zabel LLP; John C. Garces

(57) ABSTRACT

A folding-type portable information device 120 provided with an image capturing function including a first housing 104 and a second housing 106 rotatably connected via a connecting unit 108, an image capturing unit 110 being provided in the second housing 106 or in the connecting unit 108, and an image display unit 112 for displaying an image captured by the image capturing unit 110 being provided in the first housing 104, wherein an image capturing direction control unit 130, 132, 134, 136, 138, or 140 for varying the image capturing direction of the image capturing unit 110 according to the folding angle between the first housing 104 and the second housing 106 is provided.

17 Claims, 18 Drawing Sheets

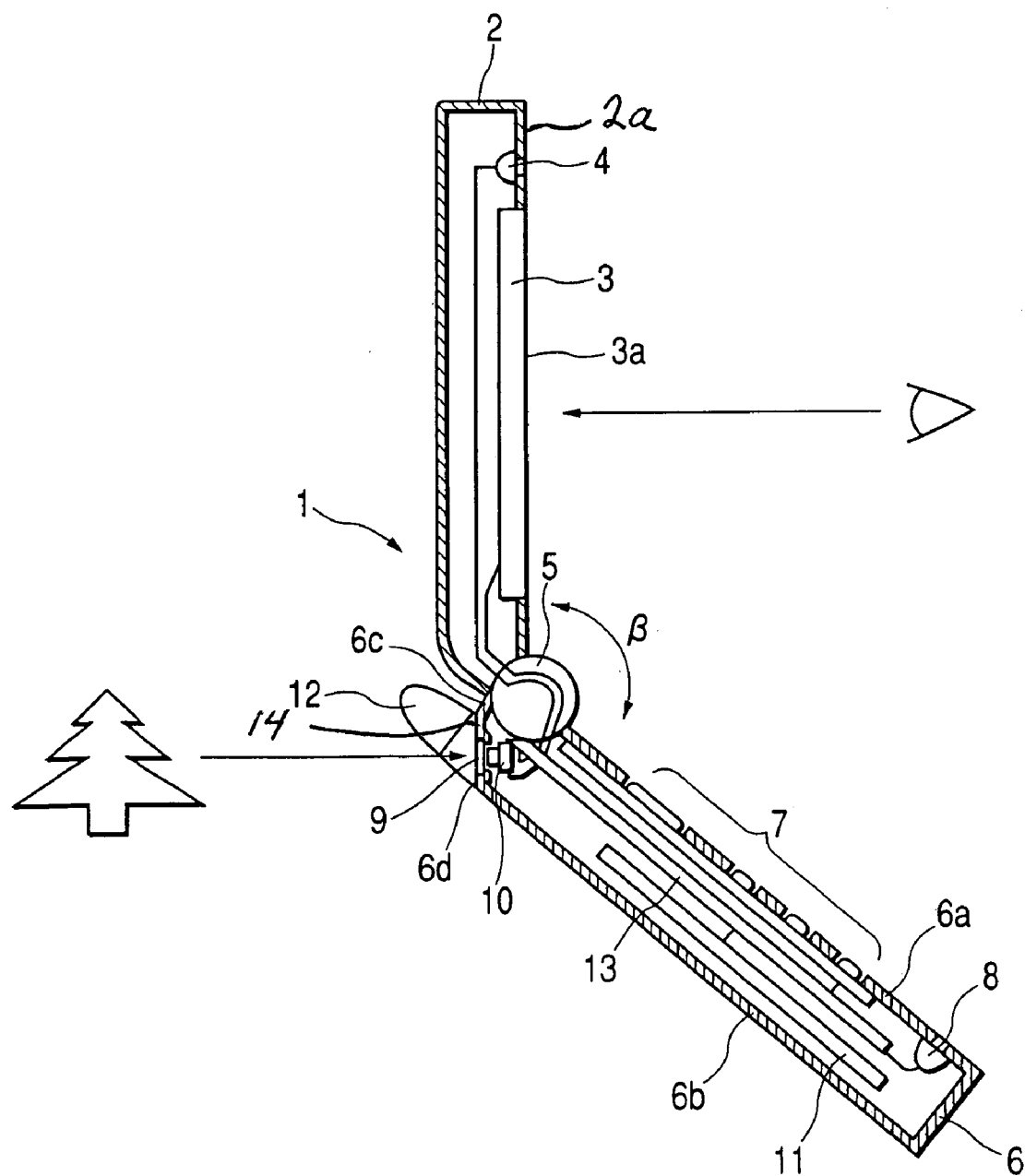

FIG. 5A
FIG. 5B
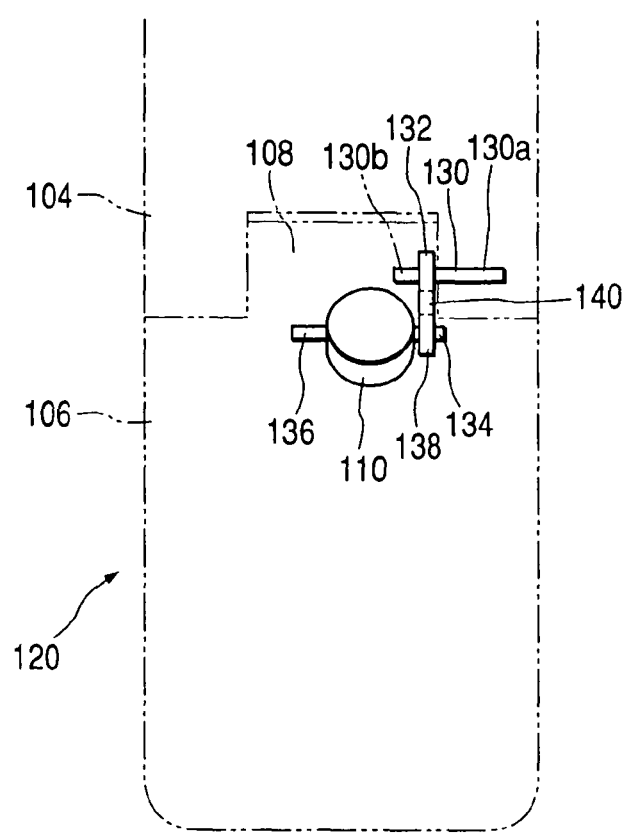
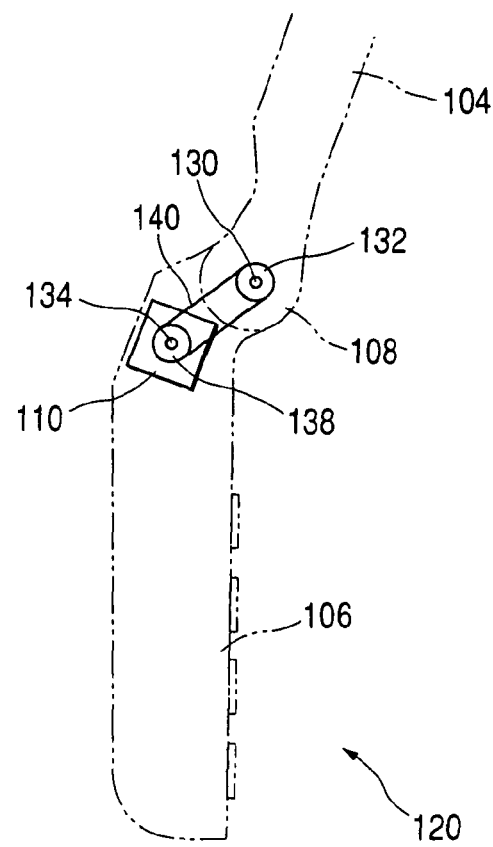

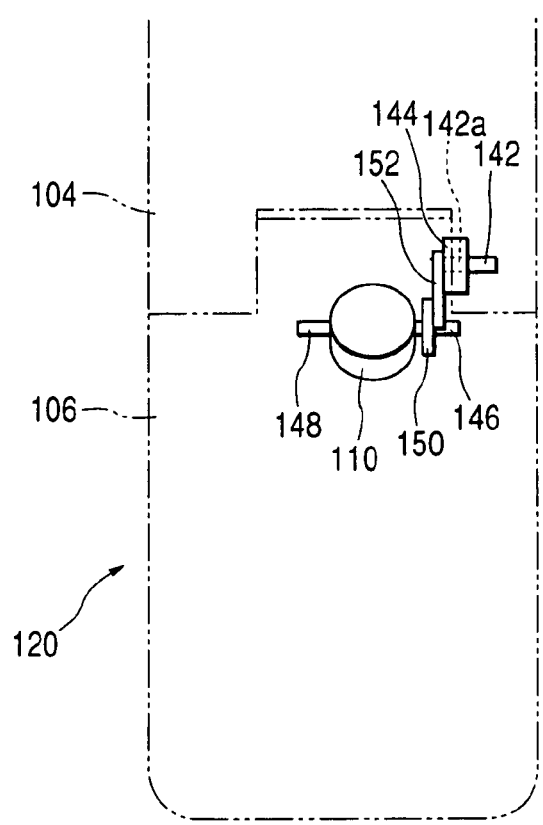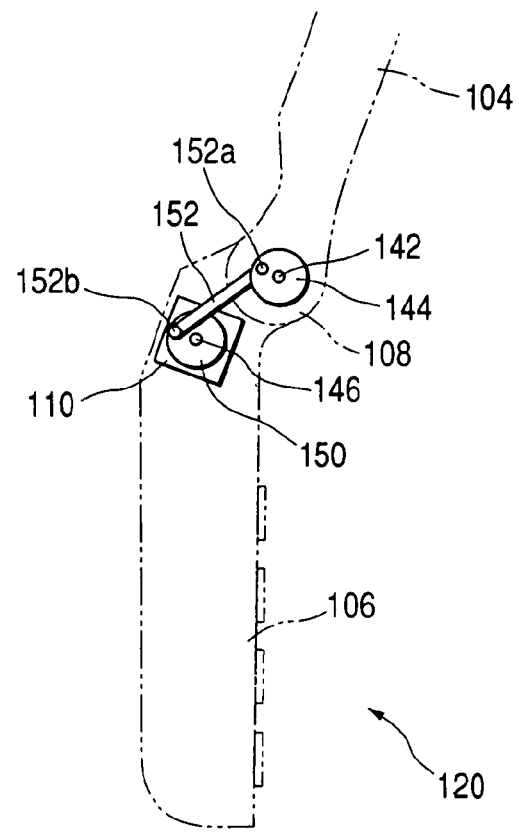

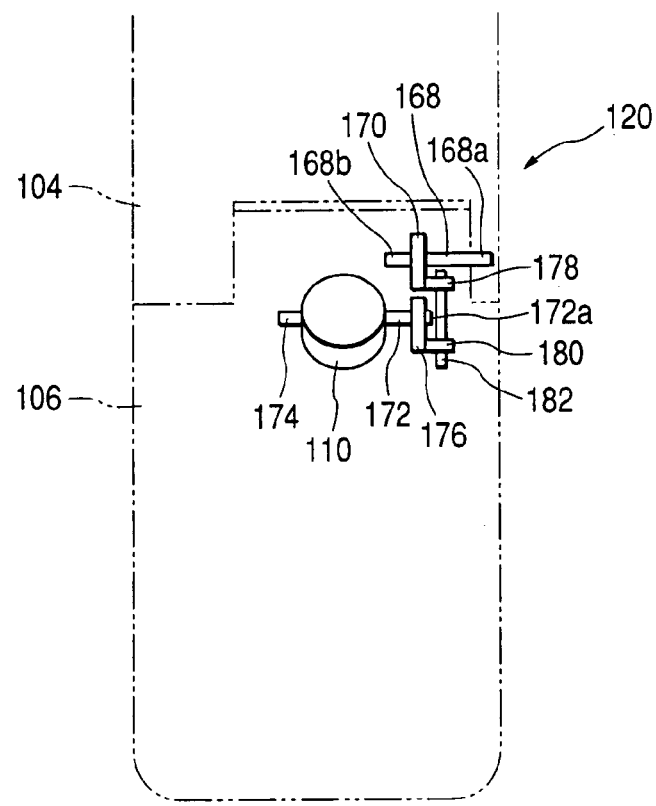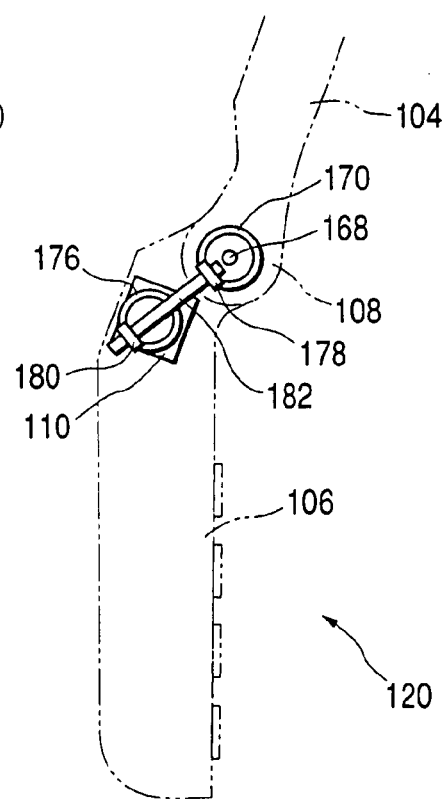

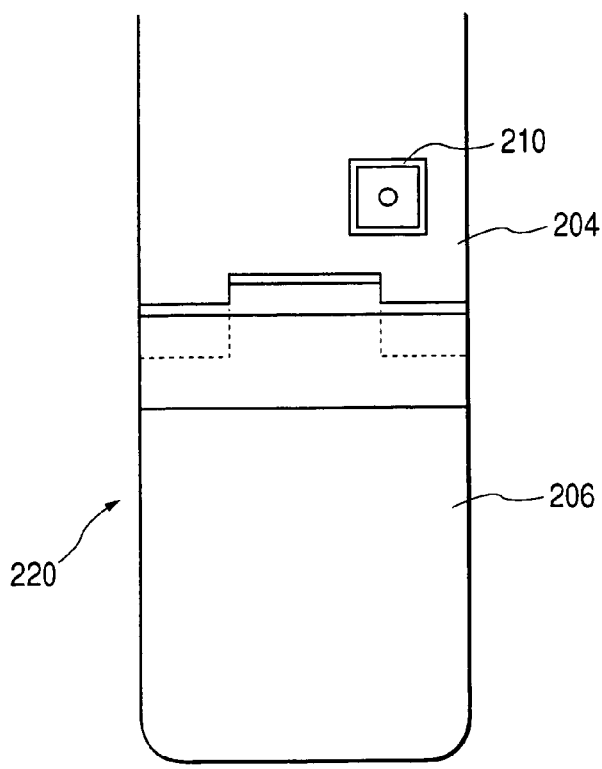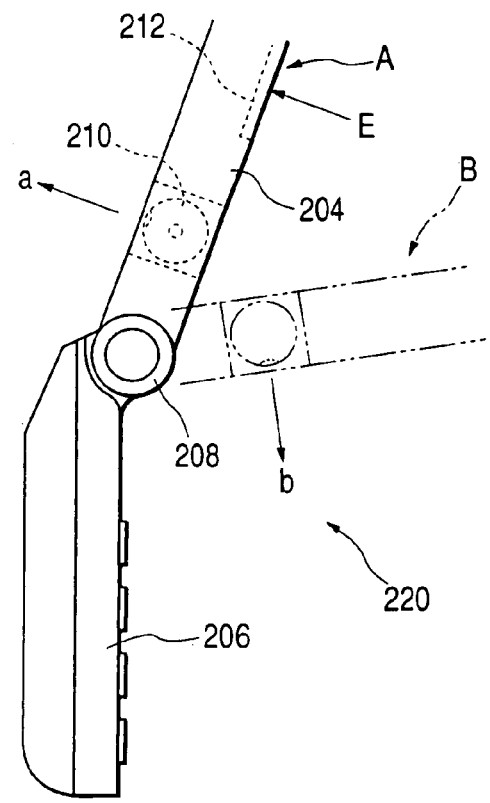

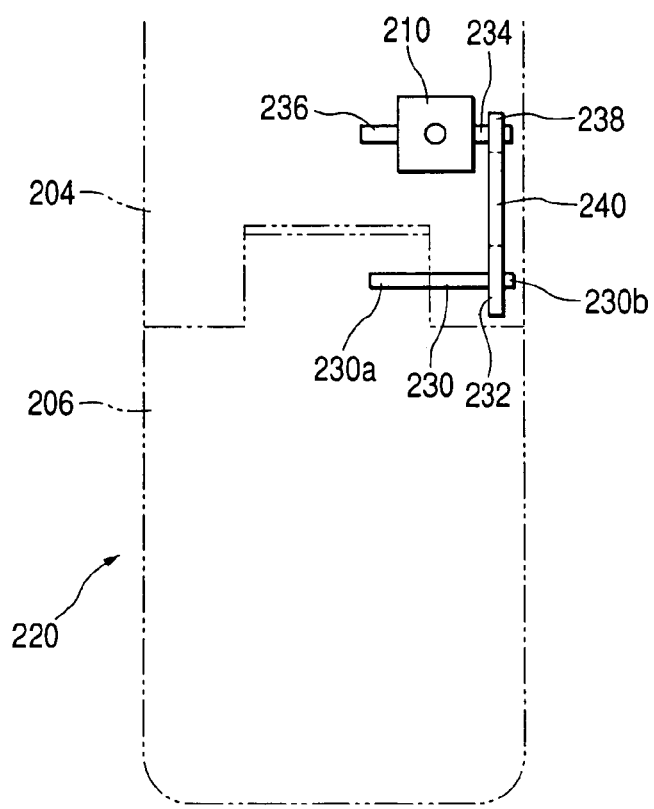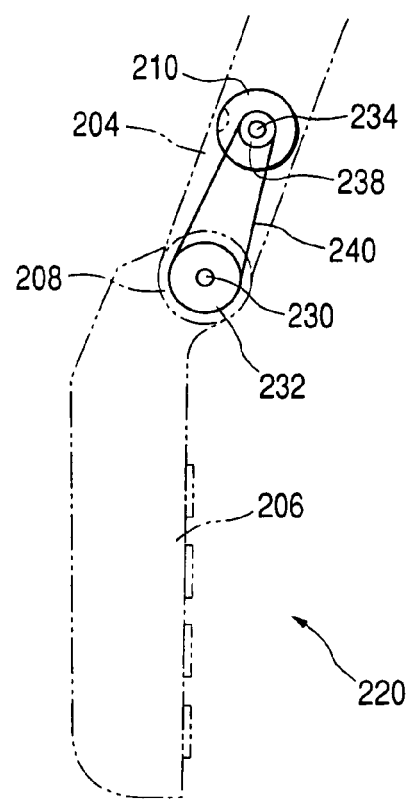

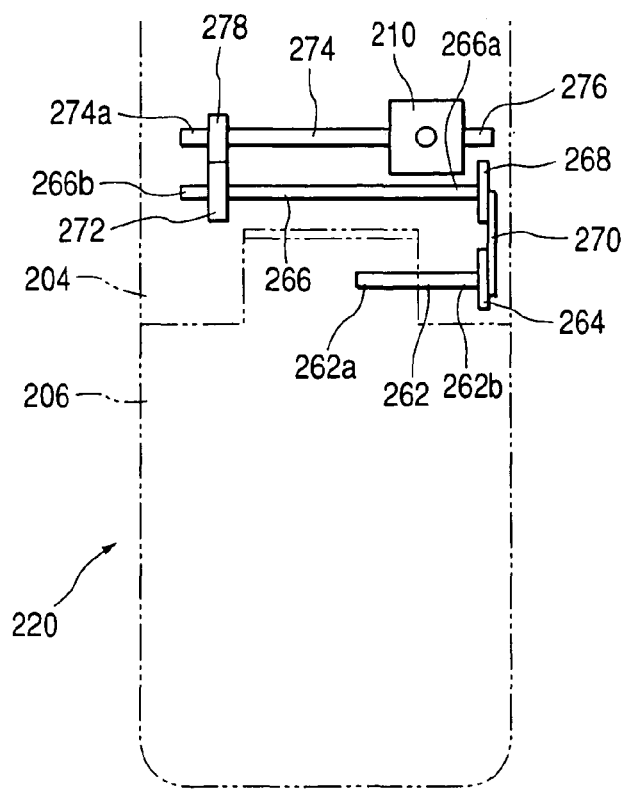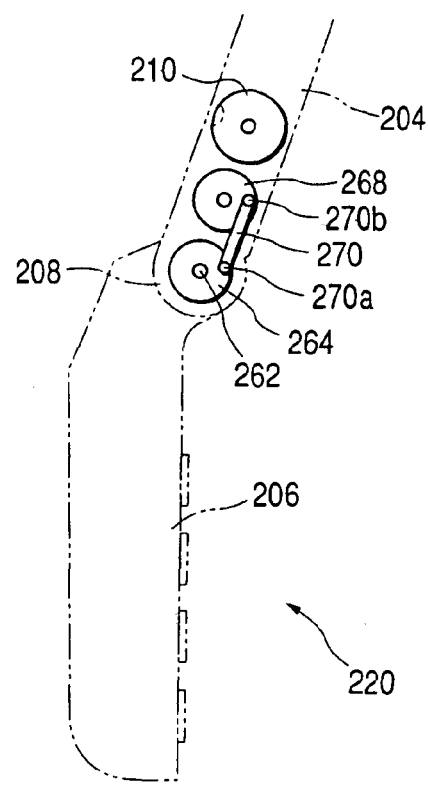

FOLDING-TYPE PORTABLE INFORMATION DEVICE PROVIDED WITH IMAGE CAPTURING FUNCTION

BACKGROUND OF THE INVENTION

I. Field of the Invention

The present invention relates to a portable information device, such as a mobile phone set or a PDA (Personal Digital Assistant) and, more specifically, to a folding-type portable information device provided with an image capturing function.

II. Description of the Related Art

Some of the portable information devices such as a mobile phone or a PDA (Personal Digital Assistant), are compact, multi-functional, and foldable, and are provided with an image capturing function such as a CCD (Charge Coupled Device).

A mobile phone set shown in FIG. 16 is an example of the portable information device with a camera in the related art. The portable information device 31 includes a first housing 32 and a second housing 36 connected with each other via a hinge unit 35 so as to be capable of rotating and varying the angle c between front surfaces 32a and 36a. The first housing 32 includes a display unit 33 and a receiving unit 34 on the front surface 32a thereof, and the second housing 36 includes a control unit 37 and a transmitting unit 38 on the front surface 36a thereof. The device can be downsized by folding the first housing 32 and the second housing 36 so as to bring the front surfaces 32a and 36a into abutment with each other, and thus the device has improved portability. The user can talk on the phone by opening the first housing 32 and the second housing 36, placing the receiving unit 34 on the first housing 32 near the user's ear and placing the transmitting unit 38 on the second housing 36 near the user's mouth.

The second housing 36 includes a camera unit 40, and a window 39 of the camera unit 40 for photographing an object 50 is provided on a backside 36b of the second housing 36. The backside 36b is on the side opposite from the front surface 36a and is parallel with the front surface 36a. When the device is switched to a camera mode in a state in which the first housing 32 and the second housing 36 are opened, the image of the object framed by the window 39 is taken into the camera unit 40 and is displayed on the display unit 33, and photographed by pressing a shutter button on the control device 37.

The reference numeral 41 designates a battery built in the second housing 36. Numeral 42 designates an antenna provided in the second housing 36, and numeral 43 designates a circuit board having a control section, storage section, and a wireless section.

As shown in FIG. 16, in the portable information device 31 provided with a folding mechanism, which is constructed of the first housing 32 and the second housing 36, the first housing 32 takes a slanted position with respect to the second housing 36 when the first housing 32 and the second housing 36 are opened in consideration of the positional relationship between an ear and a mouth of the user during a telephone call.

Therefore, when the window 39 of the camera unit 40 is directed toward the object 50 for photographing the object using the camera unit 40 provided in the portable information device 31 shown in FIG. 16, the display unit 33 on the first housing 32 becomes slanted with respect to the window 39 of the camera unit 40, and the display surface 33a of the display unit 33 is disposed diagonally with respect to the line of sight of the user. Therefore, the object 50 displayed on the display unit 33 cannot be seen clearly and thus, it is difficult to pickup the object 50 accurately for image-capturing.

Therefore, as shown in FIG. 17, a device in which the camera unit 40 is disposed in the first housing 32, and the window 39 of the camera unit 40 is disposed on the backside 32b of the first housing 32 opposite from the front surface 32a in parallel with the front surface 32a is also proposed.

Since the camera unit 40 is disposed in the first housing 32, on which the display unit 33 is provided, and the window 39 of the camera unit 40 is provided on the backside 32b disposed in parallel with the front surface 32a having the display unit 33 thereon, the display surface 33a of the display unit 33 can be disposed perpendicularly to the line of sight of the user simply by directing the window 39 toward the object 50. Therefore, the image of the object 50 displayed on the display unit 33 can be observed easily, and the object 50 can be picked up accurately for image-capturing. However, in recent years, while there is a growing need for compact portable information devices 31, there is also a need for displaying a larger quantity of information on the display unit 33 in this multimedia age. Therefore, when the camera unit 40 is disposed in the first housing 32, on which the display unit 33 is disposed, a large display unit 33 cannot be accommodated on the first housing 32, and thus, the need described above cannot be satisfied easily.

A device having a camera unit integrated in the hinge unit, or in a revolving body provided rotatably with respect to the housing is also proposed (JF-A-2002-94629 or JP-A2002-125008)

Such folding-type portable information device provided with the image capturing function in the related art includes, for example, as shown in FIG. 18, a folding-type portable information device 202 provided with an image capturing function. The portable information device 202 includes a first housing 204 on the upper side and a second housing 206 on the lower side connected via a hinge unit 208 (connecting unit) so as to be capable of folding and opening through a rotary movement with respect to each other.

The hinge unit 208 is provided with an image capturing unit 210, and the image capturing unit 210 is coaxial with the axis of rotation of the hinge unit 208 and is capable of rotating independently by manual operation, and thus the image capturing direction of the image capturing unit 210 can be adjusted manually.

The first housing 204 is provided with an image display surface 212 (image display unit) for displaying a captured image on the inner surface 204a thereof. As a different type from such a folding-type mobile phone set 202 provided with the image capturing function, there is a device in which the image capturing unit 210 is provided not on the hinge unit 208, but on the outer surface of the first housing 204 in such a manner that the image capturing direction is fixed.

Generally, since the folding-type mobile telephone set 202 provided with the image capturing function does not have a finder in the image capturing unit 210, the image supplied from the image capturing unit 210 is displayed on the image display surface 212. Therefore, when the user uses the image capturing unit 210, the user captures images while confirming the image capturing direction or the image to be captured by observing the image display surface 212.

When performing operations without talking on the phone, such as Web browsing, data communication, or e-mailing, using such a folding-type mobile phone set 202 provided with the image capturing function, the phone set is placed on a horizontal plane such as a table in such a manner that the folding angle formed between the first housing 204 and the second housing 206 ranges from about 90° to about 120°, as shown in FIG. 18.

Accordingly, the user can easily operate the keys 209 provided on the second housing 206 while viewing the image display surface 212, and thus, the operability of various functions of the folding-type mobile phone set provided with the image capturing function, such as Web browsing, is improved.

When the image capturing direction of the image capturing unit 210 is directed toward the user by manual operation, the user can take a picture of the user himself/herself without using his/her hand and send the image to a portable information device on the other party, or use the device as a TV-phone. With such a usage, the user can take his/her own picture while observing the image display surface 212.

When capturing images of things other than the user, such as the surrounding landscape, the folding angle is generally opened to an angle between about 160° and about 180°, and then the image capturing direction of the image capturing unit 210 is directed to the substantially same direction as a line of sight E of the user shown in FIG. 18. Then the user holds the folding-type mobile phone set 202 provided with the image capturing function with his/her own hand, and captures an image while observing the image capturing direction or the image to be captured on the image display surface 212.

However, in the folding-type portable information device 202 provided with the image capturing function described above, the user must operate to change the image capturing direction of the image capturing unit 210 depending on the case in which he/she performs data communication or he/she captures his/her own image, and the case in which he/she captures images of things other than the user. In addition, since the angles are slightly different every time, the operation cannot be consistent and thus, the operability is not good.

Since the hinge unit of the portable information device is complex in construction and includes wiring therein, it is very difficult to dispose the camera unit therein. Even when the camera unit can be disposed in the hinge unit, there arises another problem in that the hinge unit is forced to be upsized, and thus it becomes unbalanced with respect to the size of the housing. Furthermore, there is a possibility that its design properties (appearance) become damaged.

On the other hand, the device having the camera unit integrated in the revolving body, which is provided separately from the housing, a rotating mechanism for the revolving body is required in addition to the hinge unit, and thus, the construction becomes complex and the number of components increases, which may cause a problem in assemblability.

The same problems exist not only in the mobile telephone, but also in the portable information device such as a PDA (Personal Digital Assistants) having a folding mechanism.

SUMMARY OF THE INVENTION

Accordingly, it is an object of the present invention is to provide a portable information device provided with an image capturing function in which the image capturing direction of the image capturing unit and the direction of the line of sight of the user are aligned for making the device easy to use.

Another object of the present invention is to provide a folding-type portable information device provided with an image capturing function in which operability is improved by devising the image capturing unit to be directed to an optimal angle depending on the mode of usage.

The invention provides a portable information device including a first housing having at least a display unit, and a second housing having at least a control unit and a camera unit connected to the first housing so as to be capable of opening and closing, characterized in that the first housing takes a slanted position with respect to the second housing when the first housing and the second housing are opened, and a plane which is substantially parallel with a display surface of the display unit, is provided on the second housing, and a window of the camera unit is disposed on the plane which is substantially parallel with the display surface of the display unit.

In a state in which the first housing and the second housing are opened, preferably, the display unit is disposed on the same surface of the first housing as the control unit, and the surface which is substantially parallel with the display surface of the display unit is an inclined plane formed by cutting the corner defined by the surface of the second housing opposite from the control unit and the end surface thereof in the vicinity of the first housing, or an inclined plane formed by cutting the corner defined by the surface of the second housing having the control unit and the end surface thereof opposite from the first housing.

In order to solve the problem described above, the present invention provides a portable information device provided with an image capturing function, including a first housing and a second housing rotatably connected with respect to each other via a connecting unit; an image capturing unit being provided in the second housing or in the connecting unit; and an image display unit being provided in the first housing for displaying an image captured by the image capturing unit, wherein an image capturing direction control unit for varying the image capturing direction of the image capturing unit depending on the folding angle between the first housing and the second housing is provided.

According to the folding-type portable information device provided with the image capturing function described above, since the image capturing direction of the image capturing unit varies according to the angle formed between the first housing and the second housing, the image capturing direction of the image capturing unit and the direction of the line of sight of the user directing perpendicularly to the image display surface always matches irrespective of the magnitude of the folding angle.

In order to achieve the object described above, the present invention provides a folding-type portable information device provided with an image capturing function including a first housing, a second housing, and a connecting unit, the first housing and the second housing being constructed so as to be foldable via the connecting unit, characterized in that an image capturing unit is provided on the first housing or on the connecting unit, an image display unit for displaying an image to be captured by the image capturing unit and a control unit are each provided on one or both of the first housing and the second housing, and an image capturing direction control unit for varying the image capturing direction of the image capturing unit depending on a folding angle formed between the first housing and the second housing is provided.

According to the folding-type portable information device provided with the image capturing function described above, since the image capturing direction can be adjusted to the optimal direction in accordance with the direction in which the user directs the image capturing unit during use, the user is free from troublesome operations for aligning the image capturing direction, thereby improving its operability.

BRIEF DESCRIPTION OF THE DRAWINGS

FIGS. 1A and 1B show a mobile phone set, which is an example of a portable information device according to the present invention, in which FIG. 1A is a plan view, and FIG. 1B is a back view.

FIG. 2 is a cross-sectional view taken along the line X-X in FIG. 1A.

FIGS. 4A and 4B show a folding-type mobile phone set 120 according to the second to fifth embodiments of the present invention, in which FIG. 4A is a partial back view and FIG. 4B is a partial side view.

FIGS. 5A and 5B show the folding-type mobile phone set according to the second embodiment of the present invention, in which FIG. 5A is a partial back view and FIG. 5B is a partial side view.

FIGS. 6A and 6B show the folding-type mobile phone set according to the third embodiment of the present invention, in which FIG. 6A is a partial back view and FIG. 6B is a partial side view.

FIGS. 7A and 7B show the folding-type mobile phone set according to the fourth embodiment of the present invention, in which FIG. 7A is a partial back view and FIG. 7B is a partial side view.

FIGS. 8A and 8B show the folding-type mobile phone set according to the fifth embodiment of the present invention, in which FIG. 8A is a partial back view and FIG. 8B is a partial side view.

FIGS. 9A and 9B show a folding-type mobile phone set 220 according to the sixth, the eighth, and the ninth embodiments of the present invention, in which FIG. 9A is a partial back view and FIG. 9B is a partial side view.

FIGS. 10A and 10B show the folding-type mobile phone set according to the seventh and the tenth embodiments of the present invention, in which FIG. 10A is a partial back view and FIG. 10B is a partial side view.

FIGS. 11A and 11B show the folding-type mobile phone set according to the sixth embodiment of the present invention, in which FIG. 11A is a back view and FIG. 11B is a side view.

FIGS. 12A and 12B show a folding-type mobile phone set according to the seventh embodiment of the present invention, in which FIG. 12A is a partial back view and FIG. 12B is a partial side view.

FIGS. 13A and 13B show the folding-type mobile phone set according to the eighth embodiment of the present invention, in which FIG. 13A is a partial back view and FIG. 13B is a partial side view.

FIGS. 14A and 14B show the folding-type mobile phone set according to the ninth embodiment of the present invention, in which FIG. 14A is a partial back view and FIG. 14B is a partial side view.

FIGS. 15A and 15B show the folding-type mobile phone set according to the tenth embodiment of the present invention, in which FIG. 15A is a partial back view and FIG. 15B is a partial side view.

DETAILED DESCRIPTION OF THE PREFERRED EMBODIMENTS

Figure 1A:
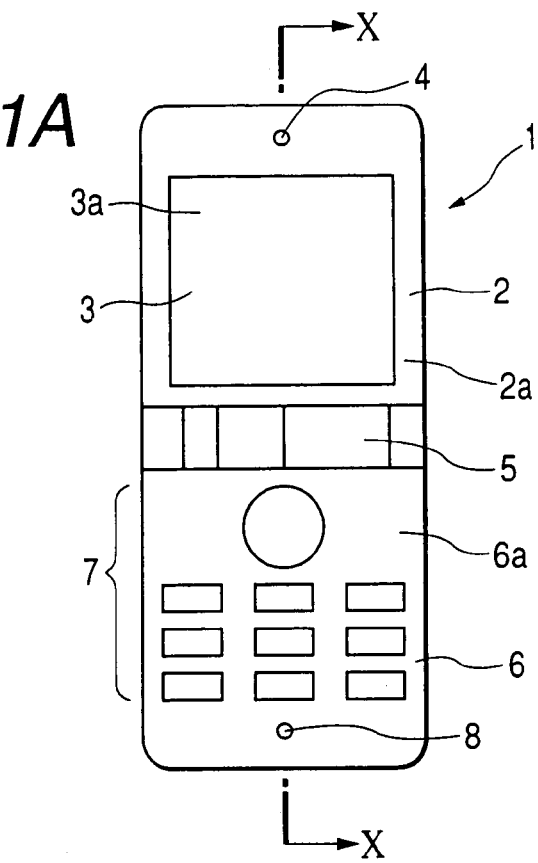

Referring now to the drawings, embodiments of the present invention will be described in detail.

Figure 1B:
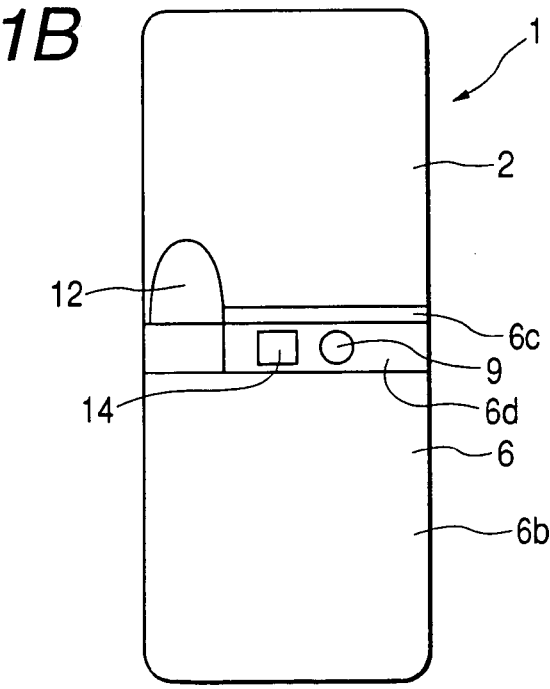

FIGS. 1A and 1B show a mobile phone set as an example of a portable information device according to the present invention, in which FIG. 1A is a plan view, and FIG. 1B is a back view. FIG. 2 is a cross sectional view taken along the line X-X in FIG. 1A.

A portable information device 1 is constructed in such a manner that a first housing 2 and a second housing 6 are rotatably connected with respect to each other via a hinge unit 5 so that an angle $\beta$ between the front surfaces 2a and 6a thereof can be varied. The first housing 2 is provided with a display unit 3 and a receiving unit 4 on the front surface 2a, and the second housing 6 is provided with a control unit 7 and a transmitting unit 8 on the front surface 6a. The length of the device can be shortened to enhance its portability when being folded by bringing the front surfaces 2a and 6a into abutment with each other, and the first housing 2 takes a slanted position with respect to the second housing 6 within a range of $90°<\beta<180°$, and more preferably, a range of $150°<\beta<180°$ when the first housing 2 and the second housing 6 are opened, so that a user can talk on the phone in a state in which the receiving unit 4 provided on the first housing 2 is placed near the user's ear and the transmitting unit 8 provided on the second housing 6 is placed near the user's mouth. In this case, since the first housing 2 is inclined with respect to the second housing 6 within the range described above, when the receiving unit 4 provided on the first housing 2 is placed near the user's ear, the transmitting unit 8 provided on the second housing 6 can be placed near the user's mouth correspondingly, and thus, sound collecting capability via the transmitting unit 8 can been enhanced and thus, a voice can be transmitted with less noise.

Reference numeral 11 designates a battery built in the second housing 6. Numeral 12 designates an antenna provided in the second housing 6, and numeral 13 designates a circuit board provided with a control section, a storage section, and a wireless section.

The second housing 6 is provided with a camera unit 10 therein, and an inclined plane 6d is formed at the corner defined by a backside 6b of the second housing 6 (surface opposite from the front surface 6a) and an end surface 6c thereof near the first housing 2 (near the hinge unit 5) so as to extend in substantially parallel with a display surface 3a of the display unit 3 when the first housing 2 and the second housing 6 are opened. A window 9 of the camera unit 10 is disposed on the inclined plane 6d and the camera unit 10 is built in behind the window 9. Reference numeral 14 designates a reflection mirror disposed on the inclined plane 6d.

Therefore, when the mode is switched to the camera mode in a state in which the first housing 2 and the second housing 6 are opened, and the window 9 is directed toward the object 50 as shown in FIG. 2, since the window 9 and the display unit 3 are disposed in substantially parallel with each other, the display surface 3a of the display unit 3 can be disposed substantially perpendicularly to the line of sight. Therefore, an image taken from the window 9 into the camera unit 10 and displayed on the display unit 3 can easily be observed, and thus, the intended object can be taken accurately for image capturing.

In addition, since the window 9 is formed on the inclined plane 6d formed by cutting the corner defined by the backside 6b of the second housing 6 and the end surface thereof near the first housing 2 (near the hinge unit 5), upsizing of the portable information device 1 is prevented.

In addition, since the camera unit 10 is provided on the second housing 6, a large display unit 3 can be disposed on the first housing 2. Therefore, visibility can be improved and a large amount of information required in the multimedia age can be taken, and larger images can be taken when photographing.

By providing the reflection mirror 14 on the inclined plane 6d, if the user wants to take a picture of himself/herself, he/she can do it easily by adjusting the position while observing his/her figure on the reflection mirror 14.

Subsequently, referring now to FIG. 3, another example of the portable information device 1 according to the invention will be described.

In this example, an inclined plane 6f, which extends in substantially parallel with the display surface 3a of the display unit 3 when the first housing 2 and the second housing 6 are opened, is formed at the corner defined by the front surface 6a of the second housing 6 having the control unit 7 and the end surface 6e thereof opposite from the first housing 2 (the side opposite from the hinge unit 5), and the window 9 of the camera unit 10 is provided on the inclined plane 6f, and the camera 10 is built in behind the window 9. Other constructions are the same as the portable information device 1 shown in FIG. 2.

With this construction, the window 9 of the camera unit 10 can be directed toward the display unit 3, and can be disposed in substantially parallel with the display surface 3a of the display unit 3. Therefore, when the mode is switched to the camera mode in a state in which the first housing 2 and the second housing 6 are opened, and the window 9 is directed toward an object 51 (toward the user in FIG. 3), the display surface 3a of the display unit 3 can be disposed substantially perpendicularly to the line of sight of the user since the window 9 and the display surface 3a of the display unit 3 are disposed in substantially parallel with each other. Therefore, an image taken from the window 9 into the camera unit 10 and displayed on the display unit 3 can be observed easily and the intended object 51 can be taken accurately for image capturing.

Since the window 9 is formed on the inclined plane 6f formed by cutting the corner defined by the front surface 6a of the second housing 6 and the end surface 6e thereof on the opposite side from the first housing 2 (opposite side from the hinge unit 5), upsizing of the portable information device 1 is prevented.

Since the camera 10 is provided on the second housing 6, the large display unit 3 can be disposed on the first housing 2. Therefore, visibility can be improved and a large amount of information required in the multimedia age can be taken, and larger images can be taken when photographing.

Figure 3:
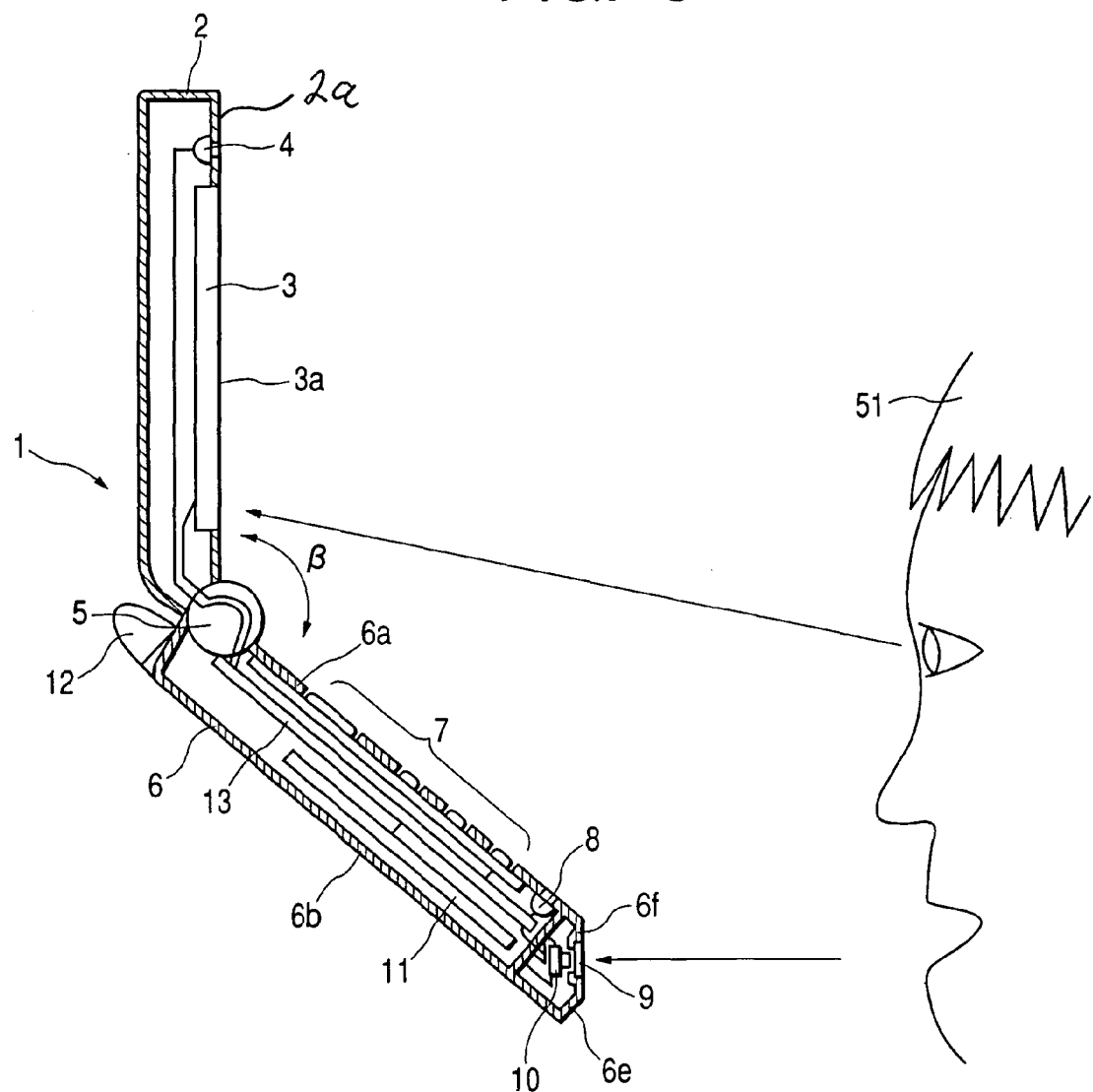
FIG. 3 is a cross-sectional view showing another example of the portable information device according to the invention.

In addition, since the portable information devices shown in FIG. 2 and FIG. 3 include an antenna 12 and the wireless section, respectively, information taken from the camera unit 10 can be transferred through the wireless section and the antenna 12 to the third party.

The present invention is not limited to the embodiments described above. For example, although an example in which the camera unit 10 is disposed immediately behind the window 9 is shown in this embodiment, the device may be adapted in such a manner that the image taken from the window 9 is reflected from the reflecting surface and guided to the camera unit 10. The window 9 for taking the image to the camera unit 10 must simply be disposed in substantially parallel with the display surface of the display unit 3 provided on the separate housing 2.

In addition, although an example of a portable information device 1 in which the first housing 2 and the second housing 6 can be opened and closed in such a manner that the angle formed between the front surfaces 2a and 6a can be varied via the hinge unit 5 has been described in the embodiments, it is also applicable to a portable information device being capable of opening and closing by rotating the first housing substantially horizontally with respect to the front surface of the second housing including the control unit.

Although a mobile phone set has been described in the embodiments described above, it is not limited thereto, and the invention is also applicable to a PDA (Personal Digital Assistants) which is becoming popular. The invention can be applied to a portable information device including at least a first housing having a display unit and a second housing having at least a control unit and a camera unit, wherein the first housing takes a slanted position with respect to the second housing when opened.

Second Embodiment

Figure 18:
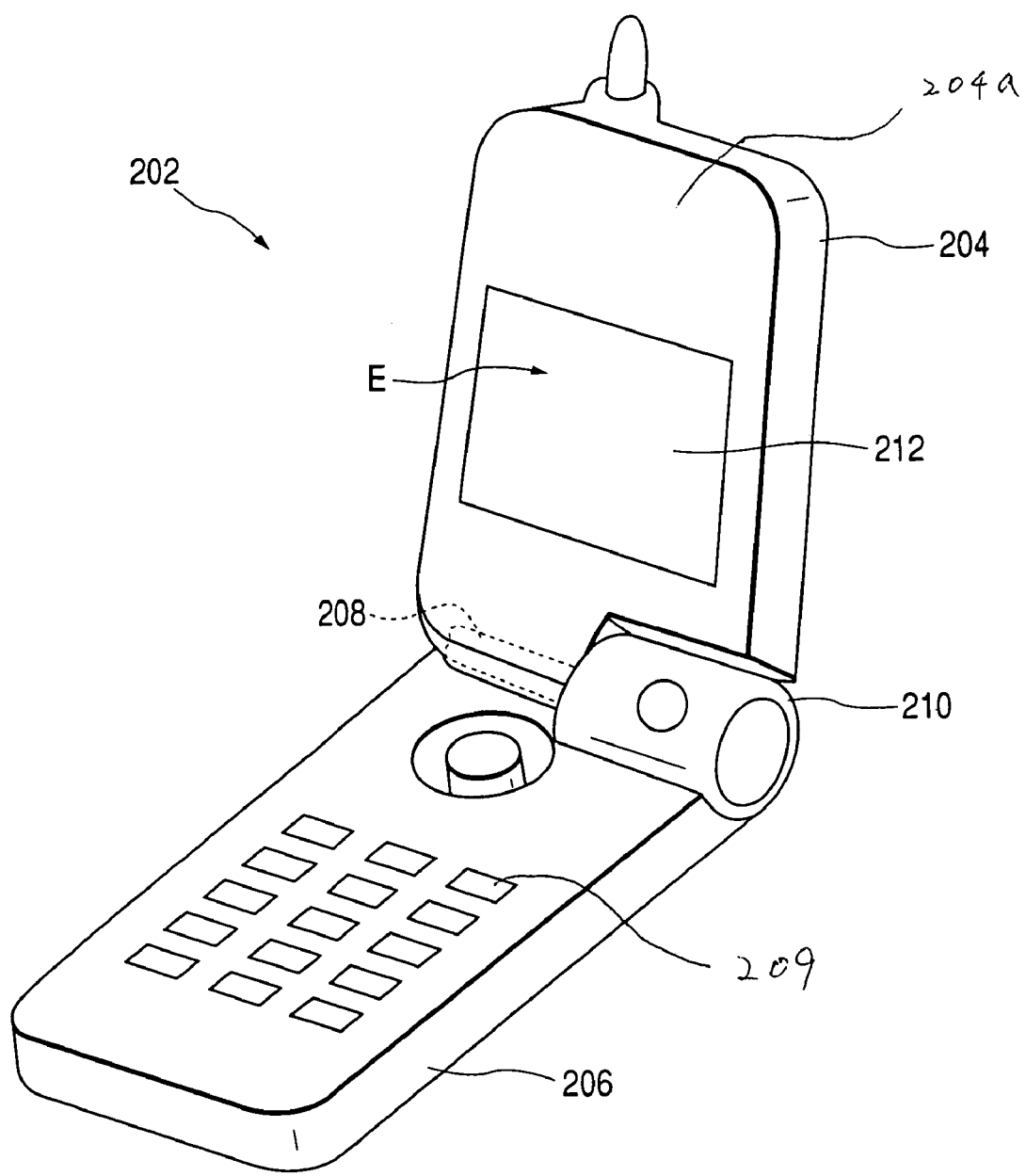
FIG. 18 is a perspective view showing a folding-type portable information device provided with an image capturing function in the related art.

In folding-type mobile phone sets 120, 220 and 222 according to the embodiments of the present invention shown in drawings 4A to 15B, identical components as in the folding-type portable information device 202 provided with the image capturing function in the related art shown in FIG. 18 will be represented by identical numerals, and the same construction as in the portable information device 202 in the related art will not be described here again.

FIGS. 4A to 8B are drawings for explaining a folding-type mobile phone set 120 according to the embodiments of a folding-type portable information device provided with an image capturing function of the invention.

Figure 4A:
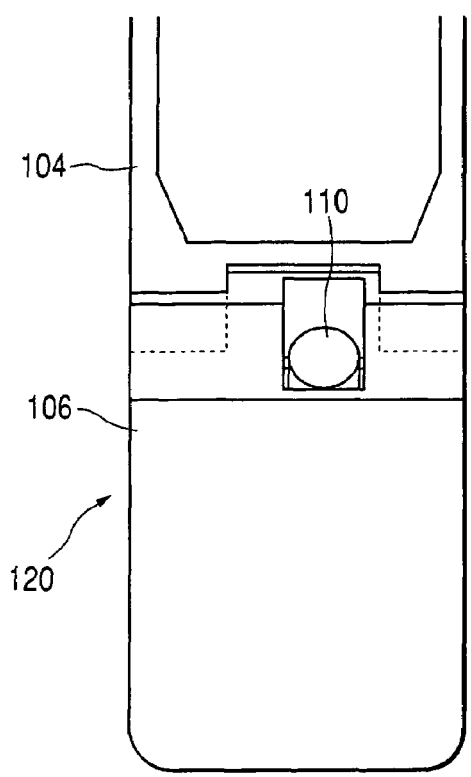
Figure 4B:
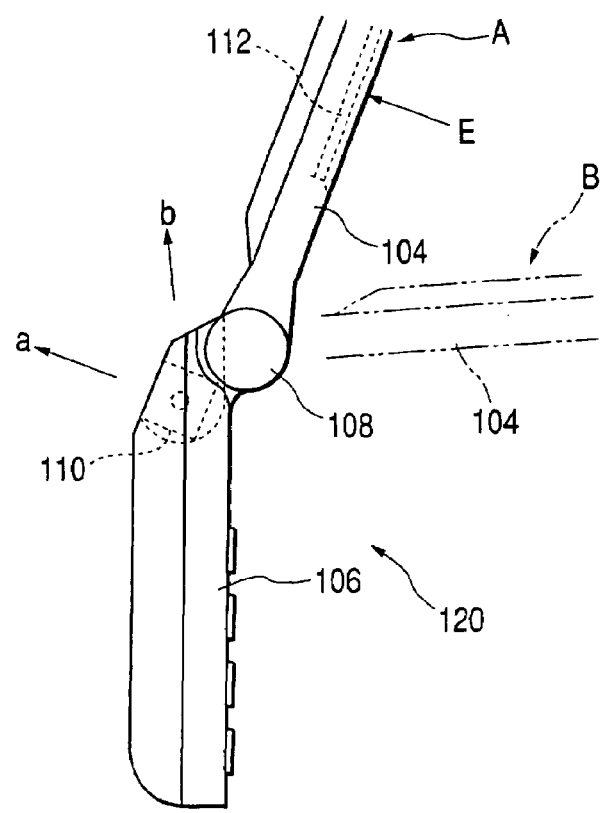

FIGS. 4A and 4B show the folding-type mobile phone set 120 having an image capturing unit 110 (a folding-type portable information device provided with an image capturing function) according to the embodiment of the present invention, in which the image capturing direction of the image capturing unit 110 matches the direction of a line of sight E of the user, which is perpendicular to an image displaying surface 112 (image display unit) according to the first to fourth embodiments that will be described later.

In FIGS. 4A and 4B, when a first housing 104 is opened to the position forming a folding angle of about 170° with respect to a second housing 106, that is, to the posture taken when the user talks on the phone (a state A shown in the drawing) as shown by a solid line, the image capturing direction of the image capturing unit 10 is the direction indicated by an arrow a.

In contrast, when the first housing 104 is opened to the position shown by a chain double-dashed line (a state B in the drawing), that is, to a folding angle of about 90°, the image capturing direction of the image capturing unit 110 is the direction indicated by an arrow b.

Even when the posture of the first housing 104 is changed from the state A to the state B in the drawing, the image capturing direction of the image capturing unit 110 follows the change in the folding angle of the first housing 104, and hence matches the direction of the line of sight E of the user directing perpendicularly to the image display surface 112.

The folding-type mobile phone set 120 of this type is realized according to the first to fourth embodiments of the invention shown in FIG. 5A to FIG. 8B. These embodiments will be described below.

The folding-type mobile phone set 120 shown in FIGS. 5A and 5B is the second embodiment of the present invention. In this embodiment, the image capturing unit 110 is rotated by a flat pulley and a flat belt.

In the same drawing, the mechanism for rotating the image capturing unit 110 is represented by a solid line, and the contours of the first housing 104 and the second housing 106 are represented by chain double-dashed lines. Detailed construction and other components are not shown in the drawings.

The axis of rotation of a shaft 130 is coaxial with the axis of rotation of a hinge unit 108 (connecting unit), and is secured to the first housing 104 at one end 130*a* and supported by a bearing (not shown) provided in the second housing 106 at the other end 130*b*, so as to be capable of rotating freely with respect to the second housing 106. A flat pulley 132 is secured to the other end 130*b* of the shaft 130.

Shafts 134 and 136 are projectingly fixed to both ends of the image capturing unit 110 provided in the second housing 106 so as to extend in parallel with the axis of rotation of the hinge unit 108, and the shafts 134 and 136 are supported in the second housing 106 so that the image capturing unit 110 is capable of rotating freely about the axes thereof.

A flat pulley 138, which is the same as the flat pulley 132 in outer diameter is fixed to the shaft 134 and a flat belt 140 is wound around the flat pulley 138 and the flat pulley 132.

With such a mechanism, when the folding angle between the first housing 104 and the second housing 106 varies, the pulley 132 rotates by the same angle accordingly via the shaft 130 of the hinge unit 108 fixed on the side of the first housing 104.

This rotary movement is transmitted by the flat belt 140 and rotates the pulley 138 on the side of the image capturing unit 110, so that the angle of the image capturing unit 110 varies in conjunction with variation in the folding angle of the first housing 104.

Therefore, irrespective of the folding angle between the first housing 104 and the second housing 106, the image capturing direction of the image capturing unit 110 can always be directed in the same direction as the line of sight E of the user directing perpendicularly to the image display surface 112.

The pulley and the belt described above are not limited to the flat pulley and the flat belt, and other types of pulleys and belts, such as a V-pulley and a V-belt, may also be employed. It is also possible to employ a synchronous pulley and a synchronous belt for preventing phase shift.

Third Embodiment

The folding-type mobile phone set 120 shown in FIGS. 6A and 6B is the third embodiment of the present invention, in which a mechanism for rotating the image capturing unit 110 by a crank mechanism is employed.

In FIGS. 6A and 6B, a shaft 142 is disposed coaxially with the axis of rotation of the hinge unit 108, and is fixed to the first housing 104. A disc 144 is secured to one end 142*a* of the shaft 142 on the side of the image capturing unit 110.

Shafts 146 and 148 are projectingly fixed to both ends of the image capturing unit 110 provided in the second housing 106 so as to extend in parallel with the axis of rotation of the hinge unit 108, so that the image capturing unit 110 is capable of rotating freely about the axes thereof.

A disc 150 is secured to the shaft 146, and the disc 144 and the disc 150 are connected via a connecting rod 152. Connections of ends 152*a* and 152*b* of the connecting rod 152 with respect to the disc 144 and the disc 145, respectively, are achieved by pin-connection.

With such a crank mechanism, when the folding angle between the first housing 104 and the second housing 106 varies, the disk 144 rotates correspondingly by the same angle via the shaft 142 fixed to the hinge unit 108 on the side of the first housing 104.

This rotary movement is transmitted by the connecting rod 152 and rotates the disc 150 on the side of the image capturing unit 110, so that the angle of image capturing unit 110 varies in conjunction with variation in the folding angle of the first housing 104.

Therefore, as in the first embodiment, irrespective of the folding angle between the first housing 104 and the second housing 106, the image capturing direction of the image capturing unit 110 can always be directed in the same direction as the line of sight E of the user directing perpendicularly to the image display surface 112.

Fourth Embodiment

Figure 7A:
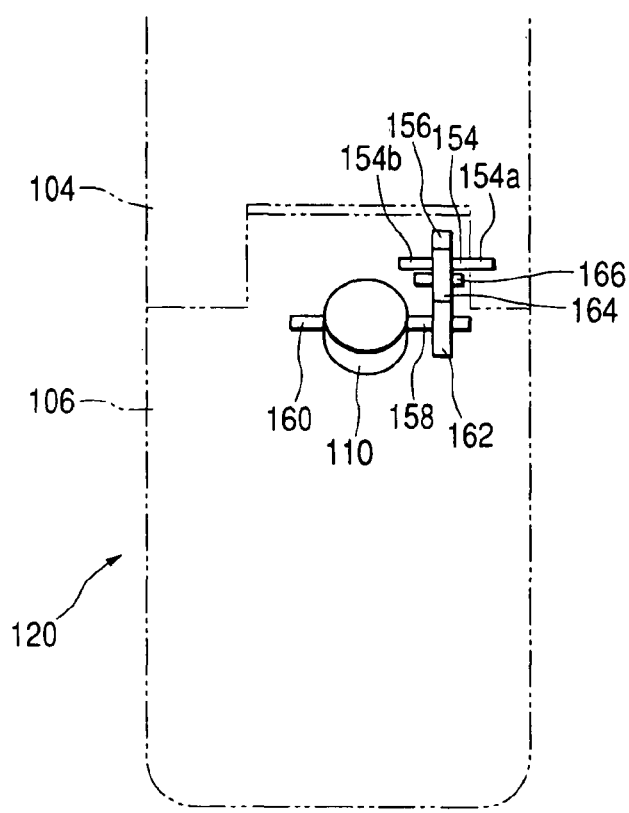
Figure 7B:
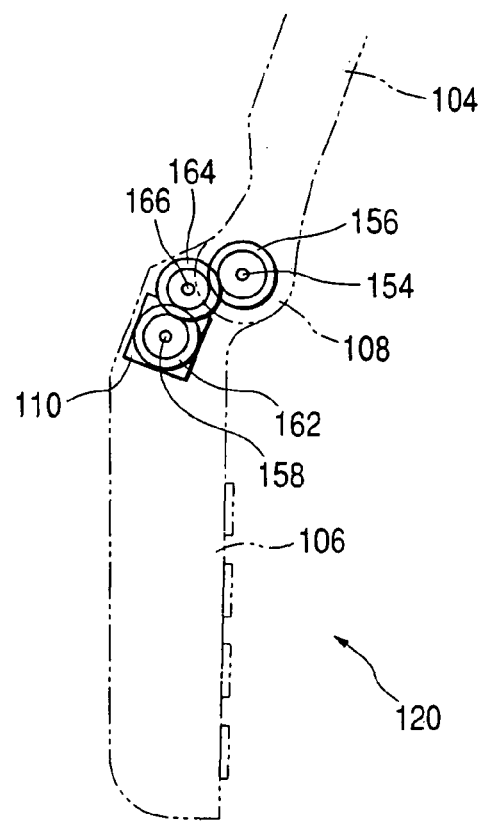

The folding-type mobile phone set 120 shown in FIGS. 7A and 7B is the fourth embodiment of the present invention, in which a mechanism for rotating the image capturing unit 110 by a gear mechanism is employed.

In FIGS. 7A and 7B, a shaft 154 is disposed coaxially with the axis of rotation of the hinge-unit 108. One end 154*a* of the shaft 154 is fixed to the first housing 104, and the other end 154*b* is supported by a bearing (not shown) in the second housing 106 so as to be capable of rotating freely. A gear 156 is secured to the other end 154*b* of the shaft 154.

Shafts 158 and 160 are projectingly fixed to both ends of the image capturing unit 110 provided in the second housing 106 so as to extend in parallel with the axis of rotation of the hinge unit 108. Since the shafts 158 and 160 are supported by bearings (not shown) provided in the second housing 106, the image capturing unit 110 is capable of rotating freely about the axes thereof.

A gear 162 having the same number of teeth as the gear 156 is fixed to the shaft 158. An intermediate gear 164, being supported by a shaft 166 fixed to the second housing 106, is provided between the gear 156 and the gear 162, and these three gears 156, 162, and 164 constitute a gear train.

With such a gear mechanism, when the folding angle between the first housing 104 and the second housing 106 varies, the gear 156 rotates correspondingly by the same angle via the shaft 154 fixed to the hinge 108 on the side of the first housing 104.

This rotary movement may be varied so that the angle of the image capturing unit 110 follows variation in the folding angle of the first housing 104 by rotating the gear 162 on the side of the image capturing unit 110 via the intermediate gear 164.

Therefore, according to this embodiment, as in the case of the second and the third embodiments, the image capturing direction of the image capturing unit 110 and the direction of the line of sight E of the user directing perpendicularly to the image display surface 112 always matches irrespective of the magnitude of the folding angle between the first housing 104 and the second housing 106.

Although the number of gears in the-gear train is three in this embodiment, the number of gears is not limited to three, and it may be any odd number for allowing the angle of the image capturing unit 110 to follow variation in the folding angle of the first housing 104.

In order to make the varying angle of the image capturing unit 110 follow variation in the folding angle between the first housing 104 and the second housing 106, it must simply be such that the number of teeth of the gear 156 which rotates via the shaft 154 fixed to the hinge unit 108 on the side of the first housing 104 and the number of teeth of the gear 162 for rotating the image capturing unit 110 are the same, and the numbers of teeth of other gears are not limited.

Fifth Embodiment

The folding-type mobile phone set 120 shown in FIGS. 8A and 8B is the fifth embodiment of the invention, in which the image capturing unit 110 is rotated by a gear mechanism employing a face gear. With such a construction, the gear mechanism can be employed without being limited by the distance between the axis of rotation of the hinge unit 108 and the axis of rotation of the image capturing unit 110.

In FIGS. 8A and 8B, a shaft 168 is coaxial with the axis of rotation of the hinge unit 108, and one end 168a thereof is secured to the first housing 104, and the other end 168B thereof is supported by the bearing (not shown) provided in the second housing 106, so as to be capable of rotating freely. A face gear 170 is secured to the other end 168b of the shaft 168.

Shafts 172 and 174 are projectingly fixed to both ends of the image capturing unit 110 provided in the second housing 106 so as to extend in parallel with the axis of rotation of the hinge unit 108, so that the image capturing unit 110 is capable of rotating about the axes thereof.

A face gear 176 having the same number of teeth as the face gear 170 is fixed to an end 172a of the shaft 172, and flat gears 178 and 180 of the same shape engage the face gear 170 and the face gear 176, respectively, and the flat gear 178 and the flat gear 180 are connected via a shaft 182.

With such a gear mechanism, when the folding angle of the first housing 104 with respect to the second housing 106 varies, the face gear 170 rotates correspondingly by the same angle via the shaft 168 fixed to the hinge unit 108 on the side of the first housing 104.

This rotary movement is transmitted via the flat gear 178, the shaft 182, and the flat gear 180, so that the angle of the image capturing unit 110 follows variation in the folding angle of the first housing 104 by rotating the face gear 176 on the side of the image capturing unit 110.

Therefore, according to this embodiment as well, as in the embodiments described above, the image capturing direction of the image capturing unit 110 and the direction of the line of sight E of the user directing perpendicularly to the image display surface 112 always matches irrespective of the magnitude of the folding angle between the first housing 104 and the second housing 106.

Although variations in the image capturing direction of the image capturing unit 110 follow variations in the folding angle of the first housing 104 in the first to fourth embodiments, it is also possible to make the image capturing direction of the image capturing unit 110 with respect to variation in the folding angle of the first housing 104 with respect to the second housing 106 vary in a different manner by varying the outer diameter of the pulley or the ratio of the numbers of teeth of the gears in the respective embodiments.

Therefore, for example, when the first housing 104 is folded toward the second housing 106, or when the folding angle is within a predetermined range (for example in the range from at least about 0° to about 30°), the image capturing direction may be directed toward the inside of the folded first and second housings 104 and 106 in order to protect the lens of the image capturing unit 110. With such a construction, the lens can be protected by being directed toward inside of the folded first and second housings immediately before folding.

The predetermined range described above may be from about 0° to about 90°. In addition, it is also possible to make the image capturing direction of the image capturing unit 110 follow variation in the folding angle only if the folding angle is within a predetermined range (for example, within the range at least from about 100° to about 150°). The predetermined range of angle may be extended if necessary.

Although the image capturing unit 110 is provided in the second housing 106 in the first to fourth embodiments, it is needless to say that the image capturing direction of the image capturing unit 110 can be varied in accordance with the folding angle between the first housing 104 and the second housing 106 based on the same technical consideration even when the image capturing unit 110 is provided in the first housing 104 or in the hinge unit 108.

Although the folding-type mobile phone set 120 according to the present invention is constructed in such a manner that the first housing 104 and the second housing 106 are folded in the vertical direction, it is not limited thereto, and may be applied to those constructed to fold these housings in the lateral direction.

Although the case where a mechanism including a pulley and belt or a gear is employed has been described in the first to fourth embodiments, a combination of these mechanisms may be employed as well.

Sixth Embodiment

FIG. 9A to FIG. 15B are drawings for describing the embodiments of the folding-type portable information device provided with the image capturing function according to the present invention.

In folding-type mobile phone sets 220 and 222 according to the embodiments of the present invention shown in these drawings, the same parts as the folding-type portable information device 202 provided with the image capturing function in the related art shown in FIG. 18 are represented by the same reference numerals, and description about the construction which is the same as the portable information device 202 in the related art will not be described here again.

FIGS. 9A and 9B and FIGS. 10A and 10B show the folding-type mobile phone sets 220 and 222 provided with an image capturing unit 210 (folding-type portable information device provided with the image capturing function) according to the embodiments of the present invention, in which the image capturing direction can be directed in the optimal direction depending on the mode of usage of the image capturing unit 210 according to sixth to tenth embodiments, which will be described later.

Figure 10A:
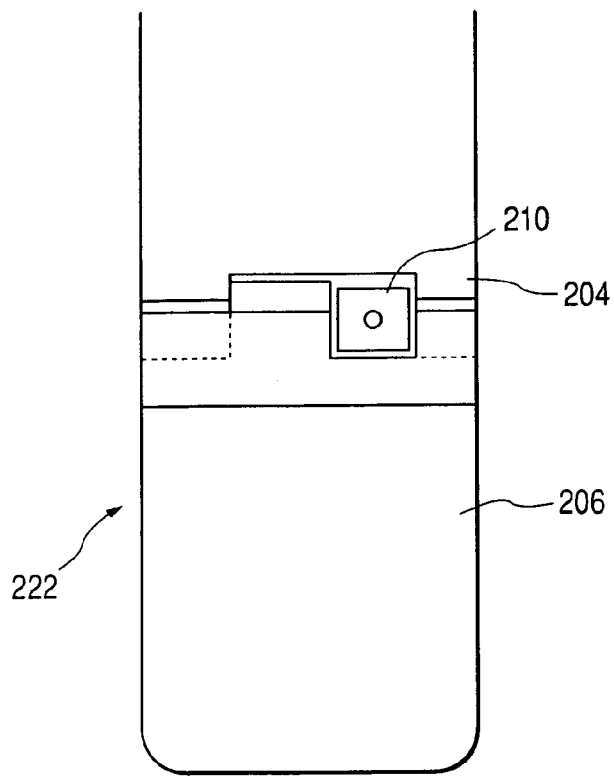
Figure 10B:
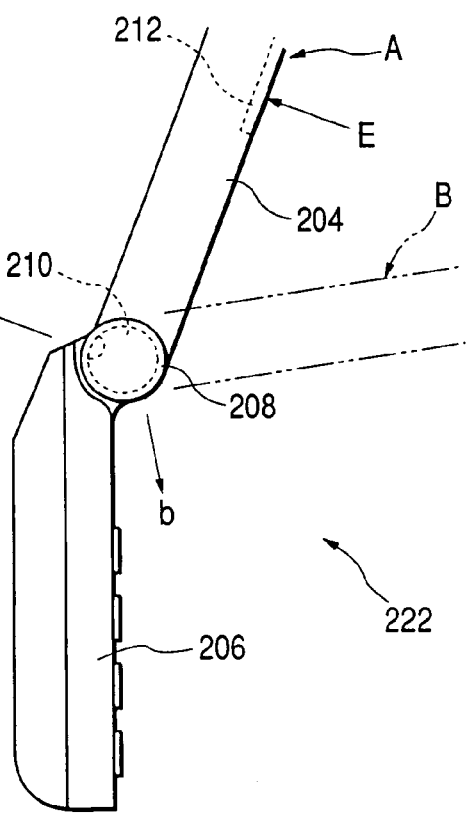

The folding-type mobile phone set 220 shown in FIGS. 9A and 9B includes the image capturing unit 210 in a first housing 204, and the folding-type mobile phone set 222 shown in FIGS. 10A and 10B includes the image capturing unit 210 in a hinge unit 208 (connecting unit).

In FIGS. 9A and 9B and FIGS. 10A and 10B, when the first housing 204 is at the position indicated by a solid line (the state A in the drawing), that is, when the folding angle formed between the first housing 204 and a second housing 206 is ranged from about 160° to about 180° so as to be suitable for capturing the image of things other then the user himself/herself, the image capturing direction of the image capturing unit 210 corresponds to a direction a.

The angle between about 160° and 180° described above is the angle to be locked by a locking mechanism in the hinge unit 208 (not shown) as an angle suitable for talking on the folding-type mobile phone sets 220 and 222.

When the first housing 204 is positioned as indicated by a chain double-dashed line (the state B in the drawing), that is, when the folding angle between the first housing 204 and the second housing 206 is in the range from about 90° to about 120° so as to be suitable for data transmission, Web browsing, e-mailing or capturing image of the user himself/herself, the image capturing direction of the image capturing unit 210 corresponds to a direction b.

The angle from about 90° to about 120° is an angle to be locked by the locking mechanism of the hinge unit 208 (not shown) as an angle suitable for operations without talking on the phone, such as Web browsing, data communication, or e-mailing, with the folding-type mobile phone sets 220 and 222.

The folding-type mobile phone sets 220 and 222 may be realized by the first to seventh embodiments shown in FIG. 11A to FIG. 15B.

The folding-type mobile phone set 220 shown in FIGS. 11A and 11B is the sixth embodiment of the present invention, in which a mechanism for rotating the image capturing unit 210 is provided in the first housing 204 by a flat pulley and a flat belt.

In the same drawing, the mechanism for rotating the image capturing unit 210 is represented by a solid line, and the contours of the first housing 204 and the second housing 206 are represented by chain double-dashed lines. Detailed construction and other components are not shown in the drawings.

In FIGS. 11A and 11B, the axis of rotation of a shaft 230 is coaxial with the axis of rotation of the hinge unit 208, and is secured to the second housing 206 at one end 230a and supported by a bearing (not shown) provided in the second housing 206 at the other end 230b, so as to be capable of rotating freely. A flat pulley 232 is secured to the other end 230b of the shaft 230.

Shafts 234 and 236 are projectingly fixed to both ends of the image capturing unit 210 provided in the first housing 204 so as to extend in parallel with the shaft 230, and the image capturing unit 210 is rotatable freely about the axes thereof 234, 236 supported by bearings (not shown) in the first housing 204.

A flat pulley 238, which is about half the flat pulley 232 in outer diameter, is fixed to the shaft 234 and a flat belt 240 is wound around the flat pulley 238 and the flat pulley 232.

With such a mechanism, when the folding angle between the first housing 204 and the second housing 206 varies, the pulley 232 relatively rotates in the opposite direction by the same angle accordingly via the shaft 230 of the hinge unit 208 fixed on the side of the second housing 206.

This rotary movement is transmitted by the flat belt 240 and rotates the pulley 238 on the side of the image capturing unit 210, so that the angle of the image capturing unit 210 varies at twice the rate of the variation in the folding angle described above.

Therefore, as shown in FIG. 9 by a solid line, when the folding angle of the first housing 204 is, for example, about 180°, the image capturing direction of the image capturing unit 210 is set to the same direction as a line of sight E of the user so as to be suitable for capturing images of things other than the user, and, as shown in a chain double-dashed line, when the folding angle of the first housing 204 is moved to about 90°, the image capturing direction of the image capturing unit 210 rotates by about 180° toward the user, so that the folding-type mobile phone set 220 suitable for data communication or for capturing the image of user himself/herself is achieved.

When the folding angle in the state shown by the solid line in FIG. 9 is, for example, 170°, and the folding angle shown by a chain double-dashed line is 100°, the same rotation as described above in conjunction with the image capturing direction of the image capturing unit 210 is achieved by setting the outer diameter of the flat pulley 232 and the flat pulley 238 as needed.

On at least one of the front surface and the back surface of the first housing 204, the image capturing unit 210 may be prevented from being directly exposed by forming the portion in the vicinity of the image capturing unit 210 of a substantially transparent member and covering the image capturing unit 210, or by opening the portion in the vicinity of the image capturing unit 210 and covering the opening by a substantially transparent member. Accordingly, the image capturing unit 210 is protected and the lens or the like of the image capturing unit 210 may be protected from scratching.

Seventh Embodiment

Figure 12A:
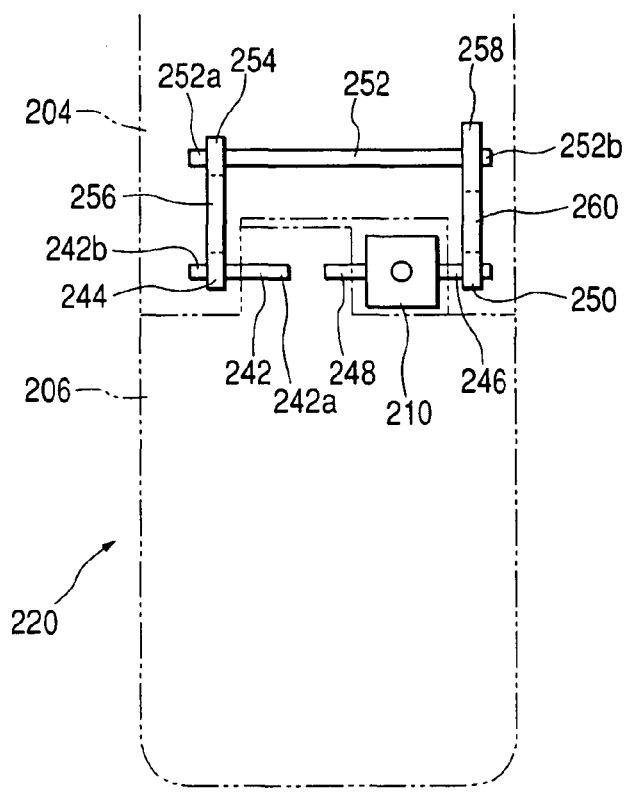
Figure 12B:
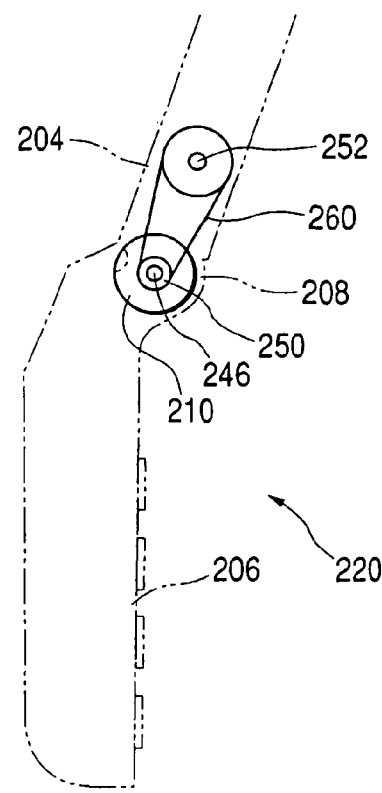

FIGS. 12A and 12B show the folding-type mobile phone set 222 according to the seventh embodiment of the present invention, in which a mechanism for rotating the image capturing unit 210 by the flat pulley and the flat belt when it is provided on the hinge unit 208.

In FIGS. 12A and 12B, the axis of rotation of a shaft 242 is coaxial with the axis of rotation of the hinge unit 208, and one end 242a thereof is fixed to the second housing 206, and the other end 242b is supported by the bearing (not shown) in the first housing 204, so as to be capable of rotating freely. A flat pulley 244 is fixed to the other end 242b of the shaft 242.

Shafts 246 and 248 are projectingly fixed to both ends of the image capturing unit 210 provided in the hinge unit 208 so as to extend coaxially with the axis of rotation of the hinge unit 208. The shaft 246 is supported by a bearing (not shown) in the first housing 204, and the shaft 248 is supported by a bearing (not shown) in the second housing 206. In other words, since the shafts 246 and 248 are rotatably supported by the bearings respectively, the image capturing unit 210 can be rotated freely about the axis.

A pulley 250 is fixed to the shaft 246. A shaft 252 is disposed in the first housing 204 so as to extend in parallel with the axis of rotation of the hinge unit 208 and rotatably supported by a bearing (not shown).

A flat pulley 254 having the same outer diameter as the flat pulley 244 is fixed to one end 252a of the shaft 252, and a flat belt 256 is wound around the flat pulley 254 and the flat pulley 244 so that the rotary movement of the flat pulley 254 is transmitted to the flat pulley 244.

A flat pulley 258 having the outer diameter twice the flat pulley 250 is fixed to the other end 252b of the shaft 252, and a flat belt 260 is wound around the flat pulley 258 and the flat pulley 250 so that the rotary movement of the flat pulley 258 is transmitted to the flat pulley 250.

With such a mechanism, when the folding angle of the first housing 204 with respect to the second housing 206 varies, the pulley 244 rotates relatively in the opposite direction by the same angle correspondingly via the shaft 242 fixed to the hinge unit 208 on the side of the second housing 206.

This rotary movement is transmitted via the flat belt 256, the pulley 254, the shaft 252, the flat pulley 258, and the flat belt 260, and rotates the pulley 250 on the side of the image capturing unit 210, so that the angle of the image capturing unit 210 can be varied at twice the rate of the variation in the folding angle described above.

Therefore, according to this embodiment as well, as in the case of the sixth embodiment, the folding-type mobile phone set 222 as shown in FIGS. 10A and 10B is achieved.

In addition, in the hinge unit 208, the image capturing unit 210 may be prevented from being directly exposed by forming the portion in the vicinity of the image capturing unit 210 of a substantially transparent member and covering the image capturing unit 210, or by opening the portion in the vicinity of the image capturing unit 210 and covering the opening by a substantially transparent member. Accordingly, the image capturing unit 210 is protected and the lens or the like of the image capturing unit 210 may be protected from scratching.

In the sixth and seventh embodiments described above, the pulley and the belt are not limited to the flat pulley and the flat belt, and other types of pulleys and belts, such as a V-pulley and a V-belt, may also be employed. It is also possible to employ a synchronous pulley and a synchronous belt for preventing phase shift.

Eighth Embodiment

FIGS. 13A and 13B show the folding-type mobile phone set 220 according to the eighth embodiment of the invention, in which the image capturing unit 210 is rotated by a combination of a crank mechanism and a gear mechanism, when the image capturing unit 210 is provided on the first housing 204.

In FIGS. 13A and 13B, the axis of rotation of a shaft 262 is coaxial with the axis of rotation of the hinge unit 208, and one end 262a thereof is fixed to the second housing 206, and the other end 262b thereof is supported by a bearing (not shown) in the first housing 204. A disc 264 is fixed to the other end 262b of the shaft 262.

A shaft 266 is disposed so as to extend in parallel with the axis of rotation of the hinge unit 208 intermediary between the image capturing unit 210 provided in the first housing 204 and the hinge unit 208, and is rotatably supported by a bearing (not shown).

A disc 268 is fixed to one end 266a of the shaft 266, and the disc 268 and the disc 264 are connected by a connecting rod 270. Connections of the ends 270a and 270b of the connecting rod 270 with respect to the disc 264 and the disc 268, respectively, are achieved by pin-connection. A gear 272 is fixed to the other end 266B of the shaft 266.

Shafts 274 and 276 are projectingly fixed to both ends of the image capturing unit 210 so as to extend in parallel with the axis of rotation of the hinge unit 208, and are rotatably supported by bearings (not shown) in the first housing 204, so that the image capturing unit 210 is capable of rotating freely about the axes thereof.

A gear 278 having half the number of teeth of the gear 272 is fixed to the end 274a of the shaft 274, so that the rotary movement is transmitted between the gear 278 and the gear 272 when engaging.

In such a mechanism, when the folding angle of the first housing 204 with respect to the second housing 206 varies, the disc 264 rotates relatively in the opposite direction by the same angle accordingly via the shaft 262 fixed to the hinge unit 208 on the side of the second housing 206.

The rotary movement is transmitted to the shaft 266 via the connecting rod 270 and the disc 268, and is in turn transmitted to the shaft 274 via the rotary gear 272 and the gear 278, so that the angle of the image capturing unit 210 varies at twice the rate of the variation in the folding angle described above.

Therefore, according to this embodiment, as in the sixth embodiment, the folding-type mobile phone set 220 as shown in FIGS. 9A and 9B is achieved.

With such a mechanism, the image capturing unit 210 can be provided at the position remote from the hinge unit 208, such as above an image display surface 212 (image display unit) by changing the length of the connecting rod 270 of a crank mechanism.

Ninth Embodiment

Figure 14A:
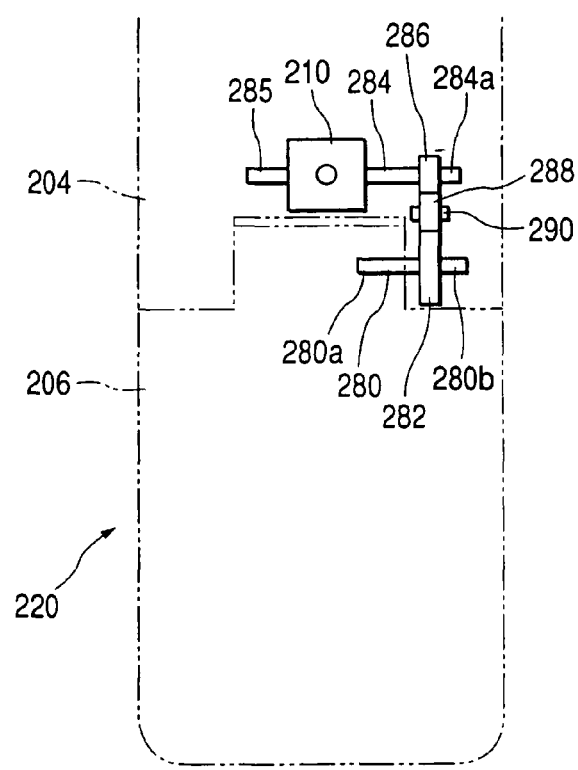
Figure 14B:
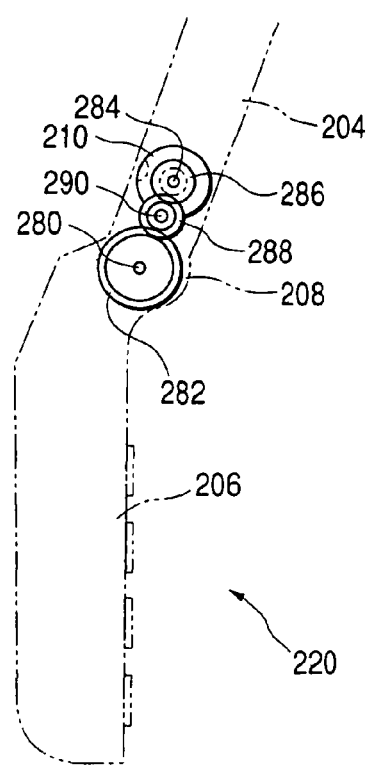

FIGS. 14A and 14B show the folding-type mobile phone set 220 according to the ninth embodiment of the present invention, in which the image capturing unit is rotated by a gear mechanism when it is provided on the first housing 204.

In FIGS. 14A and 14B, the axis of rotation of a shaft 280 is coaxial with the axis of rotation of the hinge unit 208, and one end 280a is secured to the second housing 206, and the other end 280b is supported by a bearing (not shown) in the first housing 204, so as to be capable of rotating freely with respect to the first housing 204. A gear 282 is secured to the shaft 280 on the other end 280b.

Shafts 284 and 285 are projectingly fixed to both ends of the image capturing unit 210 provided in the first housing 204 so as to extend in parallel with the axis of rotation of the hinge unit 208. Since the shafts 284 and 285 are rotatably supported by bearings (not shown), the image capturing unit 210 is capable of rotating freely about the axes thereof.

A gear 286 having half the number of teeth of the gear 282 is fixed to an end 284a of the shaft 284. An intermediate gear 288 is rotatably supported by a shaft 290 provided in the first housing 204 between the gear 286 and the gear 282. These three gears 282, 286 and 288 constitute a gear train.

With such a mechanism, when the folding angle of the first housing 204 with respect to the second housing 206 varies, the gear 282 rotates relatively in the opposite direction by the same angle correspondingly via the shaft 280 fixed to the hinge 208 on the side of the second housing 206.

The rotary movement may vary the angle of the image capturing unit 210 at twice the rate of the variation in the folding angle described above by rotating the gear 286 on the side of the image capturing unit 210 via the gear 288.

Therefore, according to this embodiment as well, as in the case of the sixth embodiment, the folding-type mobile phone set 220 as shown in FIGS. 9A and 9B is achieved.

In order to make the variation in the angle of the image capturing device 210 twice the variation of the folding angle described above, the number of teeth of the gear 286 for rotating the image capturing unit 210 must simply be half the number of teeth of the gear 282 which rotates via the shaft 280 fixed to the hinge unit 208 on the side of the second housing 206, and thus, the numbers of teeth of other gears are not limited.

Tenth Embodiment

Figure 15A:
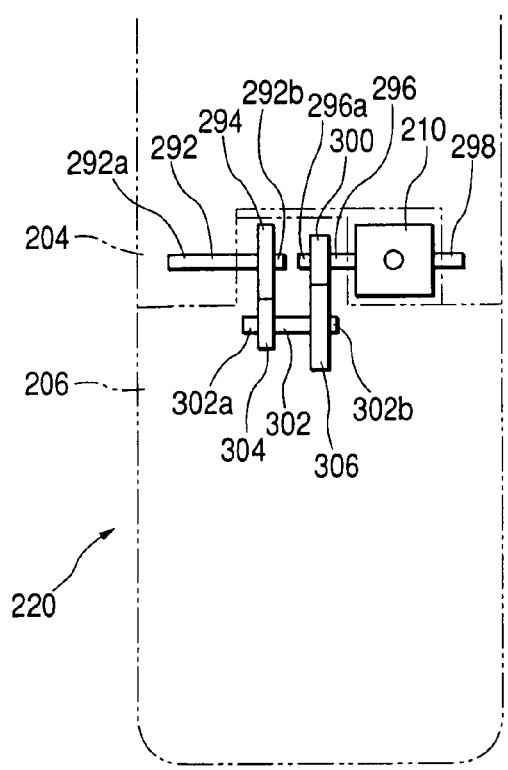
Figure 15B:
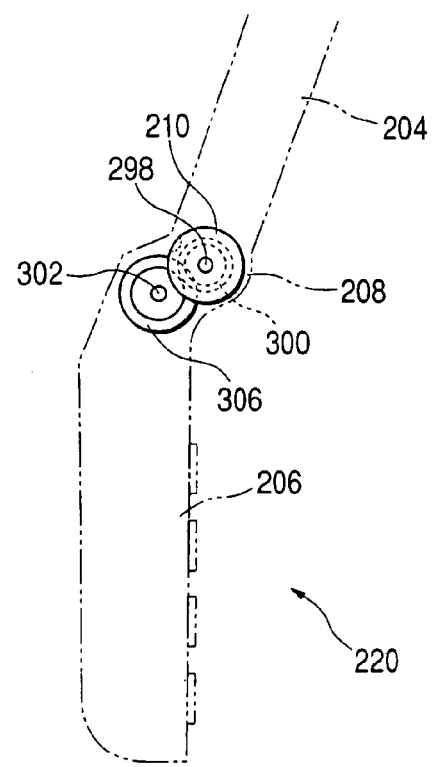
Figure 16:
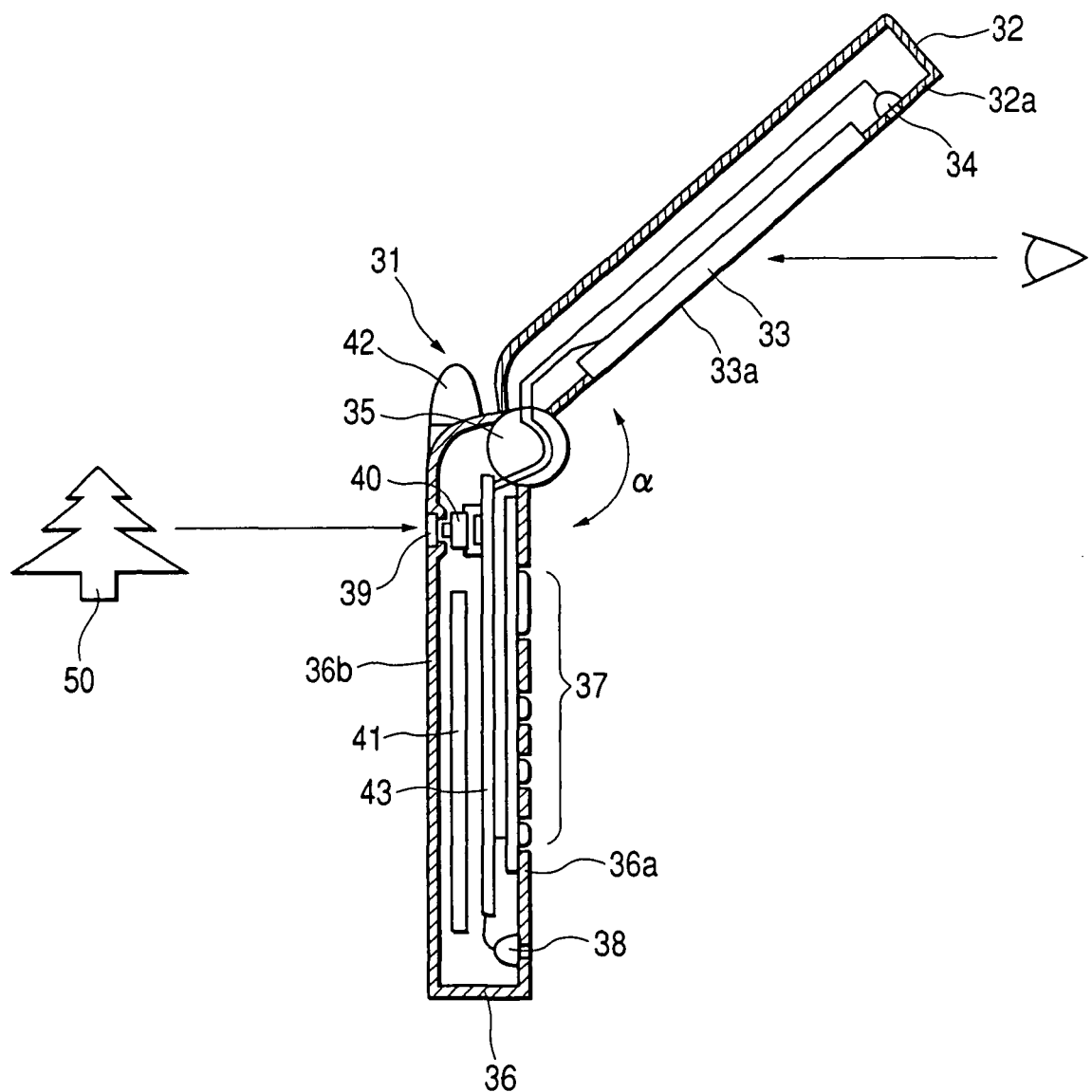
FIG. 16 is a cross-sectional view of a mobile phone set which is an example of the portable information device in the related art.
Figure 17:
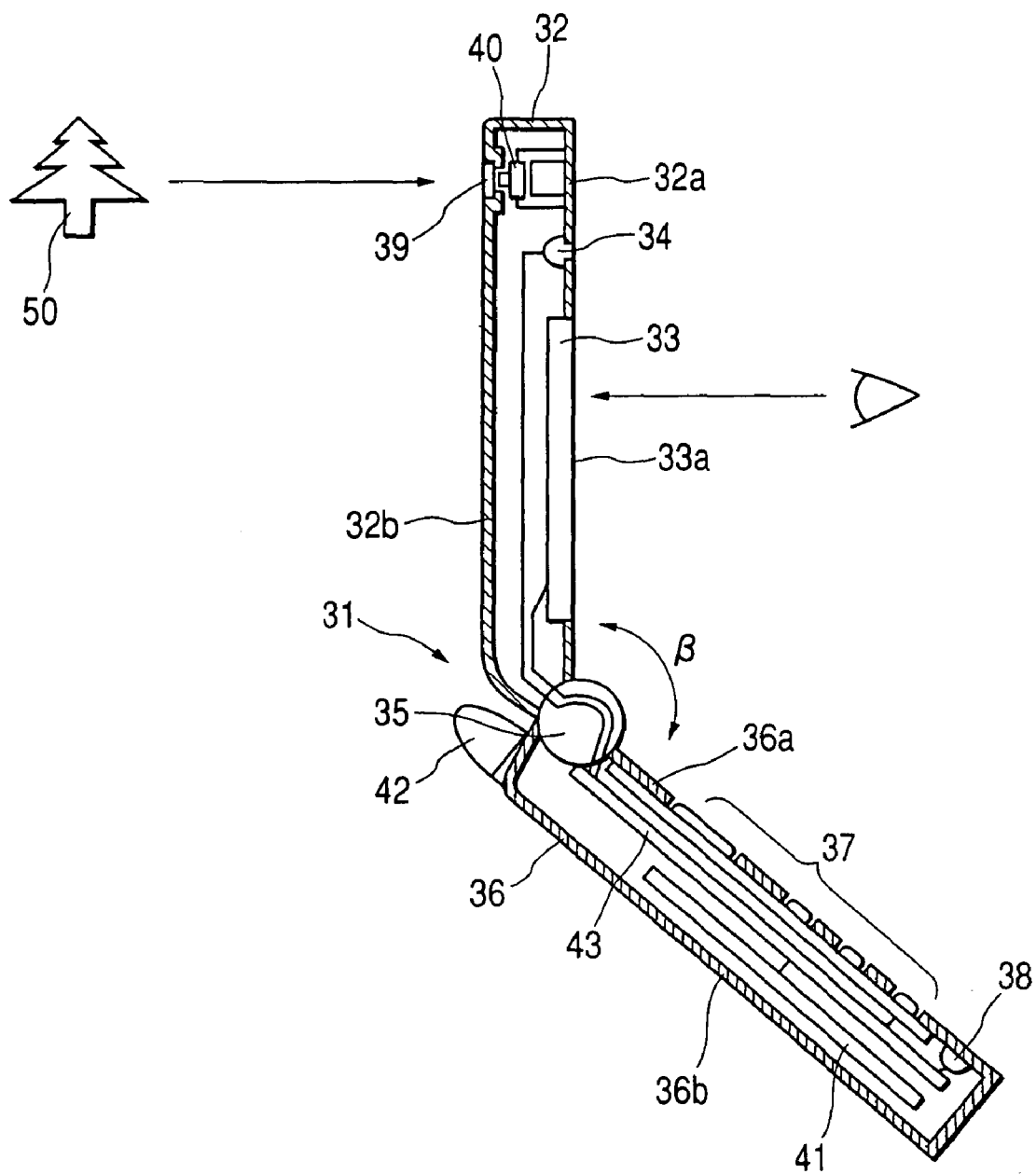
FIG. 17 is a cross-sectional view showing another mobile phone set which is an example of the portable information device in the related art.

FIGS. 15A and 15B show the folding-type mobile phone set 220 according to the tenth embodiment of the present invention, in which a mechanism for rotating the image capturing unit 210 by the gear mechanism when the image capturing unit 210 is provided on the hinge unit 208 is employed.

The axis of rotation of a shaft 292 in FIGS. 15A and 15B is coaxial with the axis of rotation of the hinge unit 208, and one end 292a thereof is fixed to the first housing 204, and the other end 292b thereof is supported by a bearing (not shown) in the first housing 204. In addition a gear 294 is fixed to the other end 292b of the shaft 292.

Shafts 296 and 298 are also projectingly fixed to both ends of the image capturing unit 210 provided in the hinge unit 208 so as to be coaxial with the axis of rotation of the hinge unit 208. The shaft 296 is supported by a bearing (not shown) in the second housing 206 and the shaft 298 is also supported by a bearing (not shown) in the first housing 204. Since the shafts 296 and 298 each are not fixed, the image capturing unit 210 can rotate freely about the axes thereof. A gear 300 is fixed to an end 296a of the shaft 296.

A shaft 302 is rotatably supported by a bearing (not shown) in the second housing 206 so as to extend in parallel with the axis of rotation of the hinge unit 208. A gear 304 is fixed to one end 302a of the shaft 302, and the gear 304 engages the gear 294 so as to be capable of transmitting the rotary movement.

A gear 306 is fixed to the other end 302b of the shaft 302, and the gear 306 engages the gear 300 so as to be capable of transmitting the rotary movement. The numbers of teeth of the gear 306 and the gear 300 are determined so that the ratio thereof becomes 1:2.

With such a mechanism, when the folding angle of the first housing 204 with respect to the second housing 206 varies, the gear 294 rotates correspondingly by the same angle via the shaft 292 fixed to the hinge unit 208 on the side of the first housing 204.

The rotational motion is transmitted via the gears 302 and 306, and rotates the gear 300 on the side of the image capturing unit 210. Accordingly, the angle of the image capturing unit 210 can be varied at twice the rate of the variation in the folding angle described above.

Therefore, according to this embodiment as well, as in the case of the seventh embodiment, the folding-type mobile phone set 222 as shown in FIGS. 10A and 10B is achieved.

Eleventh Embodiment

Subsequently, a folding-type mobile phone set according to the eleventh embodiment will be described. In this embodiment, as shown in FIGS. 9A and 9B, the image capturing direction of the image capturing unit 210 always directs the user and the angle thereof with respect to the first housing 204 is maintained at a certain identical angle as long as the first housing 204 and the second housing 206 form a predetermined range of angle between the closed state to the position at which the first housing 204 is opened to the position shown by a chain double-dashed line (state B in the drawing), that is, from the angle of about 90°, which is suitable for data communication, Web browsing, e-mailing, or image capturing of the user himself/herself to about 120°. On the other hand, when the first housing 204 opened to an angle greater than the predetermined angle, that is, about 120° (including the state A in which the first housing 204 is at the position shown by the solid line), the image capturing direction of the image capturing unit 210 is always directed to the direction opposite to the user, and the angle of the image capturing unit 210 with respect to the first housing 204 is maintained at another identical angle.

In other words, this embodiment is characterized in that the image capturing direction of the image capturing unit 210 is inverted about 180° on reaching the above-described predetermined angle, and specifically in that the inverted motion is made by an inverting mechanism provided in the hinge unit 208 (not shown.)

Twelfth Embodiment

A folding-type mobile phone set according to the twelfth embodiment of the present invention will be described. This embodiment is characterized in that the image capturing unit 210 is provided in the hinge unit 208, which differs from the sixth embodiment, in which the image capturing unit 210 described above is provided in the first housing 204. As shown in FIGS. 10A and 10B, the image capturing direction of the image capturing unit 210 always directs the user and the angle thereof with respect to the first housing 204 is maintained at a certain identical angle as long as the first housing 204 and the second housing 206 form a predetermined range of angle between the closed state to the position at which the first housing 204 is opened to the position shown by a chain double-dashed line (state B in the drawing), that is, from the angle of about 90°, which is suitable for data communication, Web browsing, e-mailing, or image capturing of the user himself/herself to about 120°. On the other hand, when the first housing 204 is opened to an angle greater than the predetermined angle, that is, about 120° (including the state A in which the first housing 204 is at the position shown by the solid line), the image capturing direction of the image capturing unit 210 is always directed to the direction opposite to the user, and the angle of the image capturing unit 210 with respect to the first housing 204 is maintained at another identical angle.

In other words, this embodiment is characterized in that the image capturing direction of the image capturing unit 210 is inverted about 180° on reaching the above-described predetermined angle, and specifically in that the inverted motion is made by an inverting mechanism provided in the hinge unit 208 (not shown).

In the sixth to twelfth embodiments described above, the image capturing unit 210 is provided in the first housing 204 or in the hinge unit 208. However, it is needless to say that the invention can be applied thereto based on the same technical considerations even when the image capturing unit 210 is provided in the second housing 206.

Although the folding-type mobile phone sets 220 and 222 according to the present invention is constructed in such a manner that the first housing and the second housing are folded in the vertical direction, it is not limited thereto, and may be applied to those constructed to fold the first housing and the second housing in the lateral direction.

Since the folding angle optimal for data transmission or for talking on the phone differs depending on the configuration of the folding-type portable information device provided with the image capturing function, the folding angles optimal for data communication and for talking on the phone, respectively, are not limited to about 90° or to about 170°.

As described above, the present invention provides a portable information device including a first housing having at least a display unit, and a second housing having at least a control unit and a camera unit connected to the first housing so as to be capable of opening and closing, characterized in that the first housing takes a slanted position with respect to the second housing when the first housing and the second housing are opened, and a plane which is substantially parallel with a display surface of the display unit, is provided on the second housing, and a window of the camera unit is disposed on the plane which is substantially parallel with the display surface of the display unit. Therefore, when in the camera mode, the object taken from the window of the camera unit can easily be observed on the display unit, so that the object can be caught accurately for photographing.

Since a large display unit can be provided without increasing the size of the portable information device, visibility can be improved, and a large quantity of information can be displayed on the display unit without impairing portability. In addition, when in the camera mode, larger images can be photographed.

In particular, the display unit is constructed in such a manner that the display unit is disposed on the surface of the first housing on the same side as the control unit when the first housing and the second housing are opened, and a surface which is substantially parallel with the display surface of the display unit is an inclined plane formed by cutting the corner defined by the surface of the second housing opposite from the control unit and the end surface thereof in the vicinity of the first housing, or an inclined plane formed by cutting the corner defined by the surface of the second housing having the control unit and the end surface thereof opposite from the first housing. Therefore, since a camera unit, which is a large component, can be disposed at the end portion in the second housing, flexibility of layout of other components is preferably improved.

As described thus far, with the folding-type portable information device provided with the image capturing function according to the present invention, since the image capturing direction of the image capturing unit varies in accordance with the folding angle between the first housing and the second housing, the image capturing direction of the image capturing unit and the direction of the line of sight of the user directing perpendicularly to the image display surface always matches irrespective of the magnitude of the folding angle. Therefore, the user can align the image capturing direction of the image capturing unit with the sense of direction of the user, whereby a device which is easy to use for the user is provided.

When the folding-type portable information device provided with the image capturing function is stored without use, the lens of the image capturing unit can be protected by making the image capturing direction of the image capturing unit direct toward inside when the first and second housings are folded.

As described above, according to the folding-type portable information device provided with the image capturing function of the present invention, since the image capturing direction of the image capturing unit can be directed to the optimal direction depending on which direction the user wants to direct the image capturing units for use, that is, depending on whether the user wants to perform data communication or image capturing of himself/herself, or the user wants to capture images of things other than the user. Therefore, it is not necessary for users to adjust the image capturing direction, which is a troublesome operation.

Even when the image capturing unit is provided in the first housing or in the connecting unit, the image capturing direction can be directed to the optimal direction.

What is claimed is:

1. A portable information device provided with an image capturing function comprising:
    a first housing including at least a display unit;
    a second housing including at least a control unit and an image capturing unit,
    the first housing and the second housing being connected so as to be capable of taking a closed state in which the first housing and the second housing are placed one on another, and an opened state in which the surfaces of the both housings facing each other are exposed from the closed state toward the outside, and
    the first housing being maintained at a slanted position at a predetermined angle with respect to the second housing when being opened,
    a portable information device provided with an image capturing function,
    wherein first housing and the second housing is foldably connected via a connecting unit,
    the portable information device further comprising an image capturing direction control unit for varying the image capturing direction of the image capturing unit by interlocking the image capturing direction with a folding angle formed between the first housing and the second housing,
    wherein the image capturing direction of the image capturing unit directs substantially perpendicularly to a display surface of the display unit when both the housings are opened.

2. A portable information device provided with an image capturing function according to claim 1, wherein the image capturing direction control unit comprises:
    a first revolving shaft provided with a pulley which rotates in conjunction with the folding angle formed between the first housing and the second housing;
    a second revolving shaft provided with a pulley which is rotatably journaled in the second housing;
    a belt wound around the pulley on the first revolving shaft and the pulley on the second revolving shaft, and
    the image capturing unit is secured so as to be capable of rotating with the second revolving shaft.

3. A portable information device provided with an image capturing function according to claim 1, wherein the image capturing direction control unit comprises:
    a crank mechanism including a first revolving shall provided with a disc which rotates in conjunction with the folding angle formed between the first housing and the second housing;
    a second revolving shaft provided with a disc rotatably journaled in the second housing; and
    a connecting rod for connecting the disc on the first revolving shaft and the disc on the second revolving shaft, and
    the image capturing unit is secured so as to rotate with the second revolving shaft.

4. A portable information device provided with an image capturing function according to claim 1, wherein the image capturing direction control unit comprises:
    a gear mechanism including a gear provided on the first revolving shaft which rotates in conjunction with the folding angle formed between the first housing and the second housing, a gear provided on the second revolving shaft rotatably journaled in the second housing, and at least one intermediate gear being meshed with the gear on time first revolving shaft and the gear on the second revolving shaft, respectively, and the image capturing unit is secured so as to rotate with the second revolving shaft.

5. A portable information device provided with an image capturing function according to claim 1, wherein when the folding angle is within a first predetermined angular range, the image capturing direction of the image capturing unit directs the direction opposite from the display surface of the display unit, and directs substantially perpendicular to the display surface.

6. A portable information device provided with an image capturing function according to claim 5, wherein the folding predetermined angular range is from about 100° to about 150°.

7. A portable information device provided with an image capturing function according to claim 1, wherein when the folding angle is within a second predetermined angular range, the image capturing direction of the image capturing unit is directed toward inside the second housing.

8. A portable information device provided with an image capturing function according to claim 7, wherein the second predetermined angular range is from about 0° to about 30°.

9. A portable information device provided with an image capturing function, comprising:
a first housing including at least a display unit;
a second housing including at least a control twit and an image capturing unit,
wherein the first housing and the second housing are connected so as to be capable of taking closed state in which the first housing and the second housing are placed on another, and an opened state in which surfaces of the both housings facing each other are exposed from the closed state toward the outside,
the first housing being maintained at a slanted position at a predetermined angle with respect to the second housing when being opened,
the second housing includes a surface extending in substantially parallel with the display surface of the display unit when in the opened, and
the surface being substantially parallel with the display surface of the display unit is formed with a image capturing window of the image capturing unit.

10. A portable information device provided with an image capturing function according to claim 9, wherein the display surface of the display unit is formed on a surface of the first housing facing to the second housing.

11. A portable information device provided with an image capturing function according to claim 10, wherein an image capturing direction of the image capturing unit directs toward the side of the display surface of the display unit or the side opposite from the display surface of the display unit.

12. A portable information device provided with an image capturing function comprising:
a first housing;
a second housing;
a connecting unit the foldably connecting the first housing and the second housing;
an image capturing unit provided in one of the first housing and the connecting unit;
a display unit for displaying an image to he captured by the image capturing unit and an operation unit respectively provided on any one or both of the first housing and the second housing;
an image capturing direction control unit for varying the image capturing direction of the image capturing unit by interlocking the image capturing direction with the folding angle formed between the first housing and the second housing; and
wherein the image capturing direction of the image capturing unit varies according to an angle formed between the first and second housings.

13. A portable information device provided with an image capturing function according to claim 12, wherein when the folding angle is within a first predetermined range, the image capturing direction of the image capturing unit directs toward the display surface of the display unit and directs substantially perpendicularly to the display surface, and when the folding angle is within a second predetermined angular range, the image capturing direction of the image capturing unit directs the side opposite from the display surface of the display unit and directs substantially perpendicularly to the display surface.

14. A portable information device provided with an image capturing function according to claim 13, wherein the portable information device provided with the image capturing function has a data communication function mid/or a telephone call function, and the second predetermined angle is an angle suitable for operating the functions.

15. A portable information device provided with an image capturing function according to claim 13, wherein the first predetermined angular range is from about 90° to about 120°, and the second predetermined angular range is from about 160° to about 180°.

16. A portable information device provided with an image capturing function according to claim 12, wherein the image capturing unit is capable of capturing the image without being exposed directly toward the outside by making the portion of the first housing or the connecting unit in the vicinity of the position at which the image capturing unit is disposed substantially transparent.

17. A portable information device provided with an image capturing function according to claim 12, wherein the image capturing direction control unit is a mechanism comprising a gear, a crank, or a pulley having a revolving shaft coaxial with the axis of rotation of the connecting unit.

* * * * *